United States Patent
Bilotta

(10) Patent No.: US 12,524,392 B2
(45) Date of Patent: *Jan. 13, 2026

(54) VIRTUAL REALITY INFORMATION DELIVERY SYSTEM

(71) Applicant: Michael Bilotta, Portola Hills, CA (US)

(72) Inventor: Michael Bilotta, Portola Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/615,649

(22) Filed: Mar. 25, 2024

(65) Prior Publication Data

US 2024/0232172 A1     Jul. 11, 2024

Related U.S. Application Data

(63) Continuation of application No. 17/122,450, filed on Dec. 15, 2020, now Pat. No. 11,940,981, which is a continuation-in-part of application No. 16/393,327, filed on Apr. 24, 2019, now Pat. No. 10,867,070, which is a continuation-in-part of application No. 15/936,145, filed on Mar. 26, 2018, now Pat. No. 10,867,066.

(Continued)

(51) Int. Cl.
| | |
|---|---|
| *G06F 21/62* | (2013.01) |
| *G06F 16/22* | (2019.01) |
| *G06F 16/23* | (2019.01) |
| *H04L 9/40* | (2022.01) |
| *G06F 3/04847* | (2022.01) |

(52) U.S. Cl.
CPC ...... *G06F 16/2365* (2019.01); *G06F 16/2228* (2019.01); *G06F 21/6245* (2013.01); *H04L 63/101* (2013.01); *G06F 3/04847* (2013.01)

(58) Field of Classification Search
None
See application file for complete search history.

(56) References Cited

U.S. PATENT DOCUMENTS

| | | |
|---|---|---|
| 5,848,396 A | 12/1998 | Gerace |
| 6,029,195 A | 2/2000 | Herz |

(Continued)

OTHER PUBLICATIONS

"eBay Launches the Most Comprehensive Trust and Safety Upgrades to The World's Largest Person-To-Person Trading Site," PRNewsire, New York, Jan. 15, 1999.

(Continued)

*Primary Examiner* — Fatoumata Traore
(74) *Attorney, Agent, or Firm* — Sunstein LLP

(57) ABSTRACT

A method for enabling a user to define a Life Based VR experience to align with the user's life. The user and partners provide custom information and settings about the user's life state which allows the user to integrate information to the Life Based VR experience. The partners may use the user's information to integrate its information, which is then interacted with in a Life Based VR experience by a user, according to various custom VR parameters. The partners may also use the user's interactions with the Life Based VR experience to assess behavior as compared to the user's life state, and the users may assess the partner's accuracy of information delivery when compared to the user's life state. The method also enables the user and partner to interact in a marketplace to procure the information relating to the user's life, user ratings, and partner ratings.

11 Claims, 16 Drawing Sheets

Related U.S. Application Data

(60) Provisional application No. 62/484,309, filed on Apr. 11, 2017.

(56) References Cited

U.S. PATENT DOCUMENTS

| | | | |
|---|---|---|---|
| 6,138,142 | A | 10/2000 | Linsk |
| 6,182,068 | B1 | 1/2001 | Culliss |
| 6,343,274 | B1 | 1/2002 | McCollom et al. |
| 6,480,835 | B1 | 11/2002 | Light |
| 6,539,377 | B1 | 3/2003 | Culliss |
| 7,069,308 | B2 | 6/2006 | Abrams |
| 7,139,157 | B2 | 11/2006 | Taylor |
| 7,328,216 | B2 | 2/2008 | Hofmann et al. |
| 7,620,628 | B2 | 11/2009 | Kapur et al. |
| 7,693,827 | B2 | 4/2010 | Zamir et al. |
| 7,716,223 | B2 * | 5/2010 | Haveliwala ......... G06F 16/9535 707/738 |
| 7,739,408 | B2 | 6/2010 | Fish et al. |
| 7,761,464 | B2 | 7/2010 | Radlinkski et al. |
| 7,783,636 | B2 | 8/2010 | Church et al. |
| 7,827,170 | B1 | 11/2010 | Horling et al. |
| 7,882,039 | B2 | 2/2011 | Weiss et al. |
| 8,484,098 | B2 | 7/2013 | Bilotta |
| 9,098,833 | B2 | 8/2015 | Yaqub |
| 2002/0078045 | A1 | 6/2002 | Dutta |
| 2003/0130983 | A1 | 7/2003 | Rebane |
| 2003/0220913 | A1 | 11/2003 | Doganata et al. |
| 2005/0028156 | A1 | 2/2005 | Hammond et al. |
| 2005/0071328 | A1 | 3/2005 | Lawrence |
| 2005/0160083 | A1 | 7/2005 | Robinson |
| 2007/0067297 | A1 | 3/2007 | Kublickis |
| 2008/0010128 | A1 | 1/2008 | Allen |
| 2008/0215994 | A1 * | 9/2008 | Harrison ............... H04L 67/131 715/757 |
| 2008/0281622 | A1 | 11/2008 | Hoal |
| 2009/0138335 | A1 | 5/2009 | Liberman |
| 2009/0204599 | A1 | 8/2009 | Morris et al. |
| 2009/0276825 | A1 | 11/2009 | Hatakeyama et al. |
| 2010/0257577 | A1 | 10/2010 | Grandison et al. |
| 2010/0280965 | A1 | 11/2010 | Vesterinen et al. |
| 2011/0145057 | A1 * | 6/2011 | Jones .................... G06Q 30/02 705/14.42 |
| 2011/0167059 | A1 | 7/2011 | Fallah |
| 2011/0208589 | A1 * | 8/2011 | Garg ................... H04M 3/4878 705/14.58 |
| 2012/0173397 | A1 | 7/2012 | Elwell et al. |

OTHER PUBLICATIONS

Ashraaf, A.R., "Is More Information Always Good? Investigating the Impact of Website Interface Features on E-Retailer's Sales Performance," Faculty of Business, Brock University, St. Catharines, Ontario, 2010.

Weber, J., "The Impact of E-Commerce Privacy Policy Statements on Consumer Willingness to Disclose Personal Information," University of Phoenix, Sep. 2008.

* cited by examiner

VIRTUAL REALITY INFORMATION DELIVERY SYSTEM

CROSS REFERENCE TO RELATED APPLICATION

This application is a continuation application U.S. patent application Ser. No. 17/122,450 filed on Dec. 15, 2020 and Continuation-in-Part of U.S. patent application Ser. No. 16/393,327, filed Apr. 24, 2019, now U.S. Pat. No. 10,867, 070, which is a Continuation-in-Part of U.S. patent application Ser. No. 15/936,145, filed Mar. 26, 2018, now U.S. Pat. No. 10,867,066, which claims the benefit of and priority to U.S. Provisional Application No. 62/484,309, filed Apr. 11, 2017, the entirety of which applications are being incorporated herein by reference.

FIELD OF THE INVENTION

Embodiments of the present invention generally relate to the field of user displayed data, the layout of the data, feedback, and interactions by the use of and in some embodiments, specifically relating to Virtual Reality "VR" zones, used in conjunction with an information delivery system, and also used in conjunction with VR devices, inputs, outputs, and related systems or other methods of VR use or interactions.

BACKGROUND

VR technologies and applications today utilize various systems, devices, inputs, outputs, and software to provide a function, experience, service, or interaction. Popular VR products provided by Oculus®, Sony®, Google®, and others compete against one another to deliver experiences that are more useful, entertaining, productive, visceral, value-added and cost-effective. Oculus is an example of a VR headset that can be used with a device such as a Samsung Galaxy, and in turn provide applications, games, and other experiences. Sony® is another example, which provides VR gear to be used for its PlayStation® products, PlayStation® VR™. Similarly, Google® provides VR devices and technology that enhance a user's interactions with the world, also known as augmented reality "AR", together with artistic renderings and experiences for a variety of applications. Another non-limiting example includes Microsoft's HoloLens which also provides an augmented VR experience. Such devices allow a user to layer information onto a view of their surroundings. VR systems may enhance existing software or may use software specifically engineered for a VR experience. VR experiences may be available to users as a simple enhancement to a function, such as an online classroom experience, or as the main feature of an experience, such as a game that can only be played with a VR system. Generally, VR systems rely on the software and systems, which are used to determine the VR intent, extent, use, features, mode, and parameters. The VR experience may be rearranged, custom designed, or shaped by the user's actions. The quality, productivity, and usability of the experience is important to the users and correspondingly the marketability of the product by the VR hardware, software, and service organizations. The accuracy and utility of the VR experience may be based on some parameters selected by a user or as implied when the user sets up VR software for use. When a VR experience is perceived by a user as accurate and useful, the user is more likely to continue using the same VR experience for the user's needs. These methods of VR experiences may be acceptable to the user in providing an early VR experience. However, these experiences fall short in providing a true depiction of the user's life, present situation, preferences, behaviors, past experiences, and other key parameters critical in determining a real depiction of a VR experience that is truly customized and structured according to the user's current life or life state.

SUMMARY

In an aspect of the invention, a method is disclosed, integrated into a VR experience, to enable a user to manage life information that is based on filtered information that dynamically structures, contributes to, changes, interacts with, and is most relevant to the user at any given point in time. The life information as integrated into VR experiences may be referred to as the user's Life Based VR. The user's Life Based VR may use categorical information related to the user's life, based on filters in areas such as, by way of non-limiting examples, demographic, health, ethnic, social and psychological aspects. As part of the user's Life Based VR, which may also be referred to as the user's Life State information, the user may define which aspects, and how the user's life information is used. The user may define which categorical areas to use, when and how the information is used, and criteria that determines the level of user life information detail used. The user may specify the categories, attributes, and information to change according to the user's life and the user's VR experiences, which may be based on an underlying information delivery system, such as, for example, the SpotMi Information Delivery System, as disclosed in U.S. Pat. No. 8,484,098, titled, "System for Information Delivery Facilitating Partner Rating of Users and User Ratings of Partners"; US patent Publication No. U.S. 2013/0275445, titled, "Information Delivery System"; US Patent Publication No. U.S. 2015/0261386, titled, "Information Based Life View"; and US Patent Publication No. U.S. 2015/0261401, titled, "Information Based Life View", each which is incorporated by reference in its entirety. The information and parameters may be prioritized based on, for example, user settings that determine preference, alignment scores derived from the underlying SpotMi Information Delivery System, other life parameters, or the like. By way of a non-limiting example, the user can configure future events and important dates to dynamically trigger changes to integrate information into the VR experience that is relevant to these dates and events as they approach. The user may also define information categories, which can be based on at least month, season, event, year, career states, geography, health, or the like.

In an aspect of the invention, the user's Life Based VR may interface with an underlying information delivery system, such as for example the SpotMi Information Delivery System, to allow users to rate the alignment for the information used in the Life Based VR. The Life Based VR information may be presented to, and modified by the user via the user's Life Based VR settings, life state settings, or the like. Some aspects of the invention may also include various devices, appliances, systems, or the like to facilitate the modification of the user's Life Based VR settings, life state settings, or the like. A marketplace, such as by way of a non-limiting example, the SpotMi Information Marketplace, as disclosed in US Publication No. 2016/0048847, titled, "Information Marketplace", which is incorporated by reference in its entirety, may integrate with the Life Based VR. The marketplace may allow suppliers of information to transact specific information through the underlying information delivery system and the marketplace. A portal or life view, such as by way of a non-limiting example, the SpotMi Life View, may integrate with the Life Based VR by providing the Life Based VR with portal or life view information, and the portal or life view information providing information to the Life Based VR, through for example an underlying SpotMi Life View.

An aspect of the invention includes a computer-implemented method, comprising receiving, prioritizing, positioning, specifying, and dynamically integrating information about and relevant to a user's life from a user, the user being a registered member of an information delivery system, wherein the information about and relevant to the user's life includes at least one of (a) demographic information, (b) health information, (c) ethnic information, (d) social information, and (e) psychological information. Enabling the user to grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner, in order for the partner to integrate customized information relevant to the user's life. Receiving the filtered information from the partner, wherein the filtered information is generated by the partner based on applying the information about and relevant to the user's life to information of the partner, wherein the information about and relevant to the user's life is provided by the user using a client computing system associated with the information delivery system, wherein the information about and relevant to the user's life is received by a server computing system associated with the information delivery system, and wherein the information about the user's life is received, specified, prioritized, positioned, displayed, and integrated in response to the user's life at the point the user realizes changes in their life state.

An aspect of the invention further comprises providing a Life Based VR experience to enable the user to integrate the filtered information, wherein the filtered information and settings are a subset of the information of the partner, and wherein the Life Based VR experience associated with the user is independently configurable from a Life Based VR experience associated with another user of the information delivery system.

An aspect of the invention further comprises providing, interacting, and integrating information from a marketplace to enable partners to procure the information about the user's life, wherein the user may interact with, specify, prioritize, position, display, and integrate information regarding marketplace interests, bids, offers, or transactions.

An aspect of the invention further comprises providing, interacting, and integrating information to and from a life view to enable users and partners to interact with information about the user's life, wherein the user may view and interact with, prioritize, position, integrate, and display information regarding the user's life as part of a Life Based VR experience.

An aspect of the invention further comprises establishing a data structure to enable the user to provide the information about and relevant to the user's life, the data structure including fields related to one another, wherein each of the fields is associated with a value, wherein the data structure includes multiple levels such that a field at a lower level is to provide more detailed information and value than a corresponding field at a higher level, and wherein information may be displayed, specified, prioritized, positioned, and integrated in a Life Based VR experience from multiple levels according to the user's life.

An aspect of the invention further comprises automatically populating the fields of the data structure with a set of baseline values. Enabling the user to update the baseline values and non-baseline values to accurately reflect the user's life, wherein baseline information may be specified, displayed, prioritized, positioned, and integrated in the Life Based VR experience from multiple levels according to the user's life.

An aspect of the invention further comprises enabling the user to update the baseline values and the non-baseline values using a mobile computing system and a mobile application associated with the information delivery system, wherein information may be specified, displayed, prioritized, positioned, and integrated in the Life Based VR experience using a computing system modified by a mobile application.

An aspect of the invention further comprises enabling the user to rate the partner based on whether the filtered information from the partner is aligned with the information about and relevant to the user's life. Enabling the partner to rate the user based on whether the information about and relevant to the user's life is aligned with behavior of the user when the user interacts with a Life Based VR experience, website, device associated with the partner, wherein the user rating for the partner may be used as a setting in the user's specification, prioritization, positioning, displaying, and integration of that partner's information in the Life Based VR experience, and wherein the partner rating for the user may be visible in the user's specifications, prioritization, positioning, displaying, and integration of that partner's information in the Life Based VR experience.

An aspect of the invention further comprises storing the information about and relevant to the user's life and Life Based VR experience in a secured relational database associated with the information delivery system. Enabling the information about and relevant to the user's life to be accessed by the partner when the user interacts with a Life Based VR experience or a website of the partner, and enabling the information about and relevant to the user's life to be customized and accessed by the user through the user's Life Based VR experience.

An aspect of the invention further comprises wherein customized VR experiences, websites, or devices are presented to the user when the user interacts with the Life Based VR experience, websites, or devices, wherein the customized VR experiences, websites, or devices are generated by the partner based on the information about and relevant to the user's life, and wherein the user may access these customized VR experiences, websites, or devices from a Life Based VR experience.

An aspect of the invention further comprises wherein filtered information is presented to and integrated into the users Life Based VR experience when the user interacts with a VR system of the partner, wherein the information is generated by the partner based on parameters provided by the user and based on the information about and relevant to the user's life, and wherein the parameters used by the partner may be factored into the information pushed by the partner into the Life Based VR experience.

An aspect of the invention comprises a computer-readable media that stores instructions, which when executed by a machine, cause the machine to perform operations comprising receiving information about a user's life from a user who is a registered member of an information delivery system, wherein the information about the user's life includes at least demographic, health, ethnic, social and psychological information. Enabling the user to set parameters to control (a) access to the information about the user's life by a partner and (b) volume and frequency of filtered information to be received from the partner on behalf of the user, wherein the partner is also a registered member of the information delivery system. Receiving the filtered information from the partner, wherein the filtered information is generated by applying the parameters to information of the partner; and specifying, displaying, prioritizing, positioning, presenting, and integrating the filtered information into a user Life Based VR experience.

An aspect of the invention further comprises wherein the user further sets the parameters to control (a) applications for receiving and integrating the filtered information from the partner, and (b) extent, depth of detail, type, and use of customized filtering of information to be integrated into the user Life Based VR experience, based on the user's life and Life Based VR experience preferences.

An aspect of the invention further comprises establishing a data structure to enable the user to provide the information about the user's life, the data structure including fields related to one another, wherein each of the fields is associated with a value representing one aspect of the user's life. Automatically populating the fields of the data structure with a set of baseline values. Enabling the user to manually update the values to more accurately reflect the user's life. Enabling the user to rate the partner based on whether the filtered information pushed and integrated by the partner is aligned with the information about the user's life. Enabling the partner to rate the user based on whether the information about the user's life is aligned with behavior of the user when the user interacts with the Life Based VR experience, or visits a website associated with the partner. Presenting the baseline values or updated values, and the partner and the user ratings, in a user Life Based VR experience, or a website, according to the user's defining of applications, extent of attributes, depth of attribute detail, type, usage, and custom VR settings.

An aspect of the invention further comprises providing a marketplace for the partners or users to purchase the information about the user's life. Enabling the partner to use the information about the user's life to customize information provided to the Life Based VR experience by the partner when the user interacts with a VR system of the partner. Enabling marketplace information to be displayed in the user Life Based VR experience, according to application, extent of attributes, depth of attribute detail, type, usage, and custom VR settings. Enabling the user to interact with and use marketplace information in the user's Life Based VR experience.

An aspect of the invention further comprises wherein the marketplace is an auction-based marketplace, wherein the Life Based VR experiences include interactions that present filtered information when the VR system is associated with a Life Based VR user, and wherein the customized Life Based VR experience includes filtered, parameterized, custom integrated information, and custom settings associated with a life state, market place, and Life Based VR experience.

An aspect of the invention further comprises enabling the user to cause the values of the fields of the data structure to be updated using a mobile application associated with the information delivery system, and wherein the user may access, interact with, and modify settings for a Life Based VR experience.

An aspect of the invention further comprises wherein the mobile application is configured to enable the user to provide a user experience and to cause one or more values of the fields of the data structure to be updated according to the user experience; and wherein the updated information and user experience may be accessed, updated, and interacted with, in a user's Life Based VR experience.

An aspect of the invention comprises a system, comprising an information delivery server connected to a network, the information delivery server configured to: (a) enable a user to provide information about a user's life using a client computing system coupled with the information delivery server, wherein the information about the user's life includes at least demographic, health, ethnic, social and psychological information, and wherein the information about the user's life is stored in a database coupled with the information delivery server, the client computing system connected to the network; (b) enable the user to set parameters that control access to the information about the user's life by a partner and volume, depth, and frequency of information to be received from the partner, wherein the information received from the partner is to be aligned with the information about the user's life, and wherein the partner is associated with a partner server connected to the network; (c) enable the partner to rate the user based on whether behavior of the user when the user interacts with a VR experience or visits a website of the partner, which is aligned with the information about the user's life; (d) enable the user to rate the partner based on whether the information received from the partner and integrated to the VR experience is aligned with the information about the user's life; and (e) enable the user to access, update, and interact with a user Life Based VR experience, which contains custom information, wherein the custom information may be further customized by specifying, displaying, prioritizing, positioning, defining extent, defining depth, type, usage, and other user defined custom settings that change how the information is integrated into a user Life Based VR experience.

An aspect of the invention further comprises wherein the information delivery server and Life Based VR experience are further configured to (a) provide a marketplace to enable the partner to purchase the information about the user's life and (b) provide a life view to present the information received from the partner to the user according to priorities, positioning settings, and other user defined settings and (c) provide a life view to receive changes that occur from within the Life Based VR experience.

An aspect of the invention further comprises wherein the user and the partner are registered with the information delivery server, and wherein the information delivery server is further configured to (a) receive updated information about the user's life from the user via a mobile computing device, and (b) enable the partner to access the information about the user's life to customize the Life Based VR experience of the partner according to the information about the user's life; and (c) enable the user to access, update, and interact with a user Life Based VR experience via a mobile computing device.

BRIEF DESCRIPTION OF THE DRAWINGS

The multiple drawings refer to the embodiments of the invention. While embodiments of the invention described herein is subject to various modifications and alternative forms, specific embodiments thereof have been shown by way of example in the drawings and will herein be described in detail.

DETAILED DESCRIPTION

Figure 1:
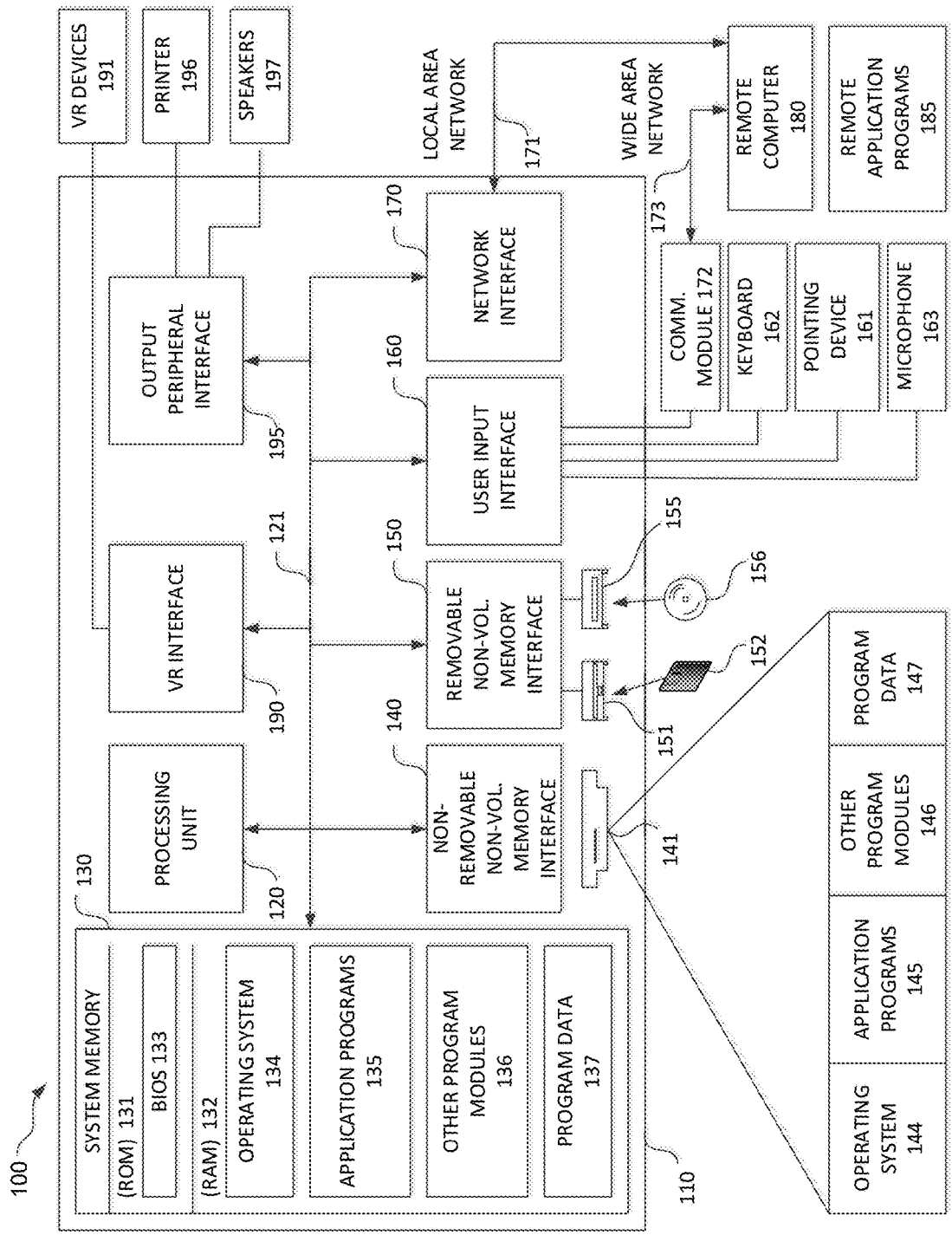
FIG. 1 illustrates an exemplary computing device that may be used, in accordance with the present disclosure.

In the following description of exemplary embodiments, reference is made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof. As used herein, the term Virtual Reality ("VR") may include any virtual reality, augmented reality ("AR"), holographic imaging, image overlaying, or similar experience that is contemplated to be within the spirit and scope of the present invention. It will also be appreciated that the scope of the present invention may include any device, system, or apparatus that presents virtual, augmented, holographic, or similar such experience. It will also be understood that such devices, systems, or apparatus may be standalone devices, or be coupled with the user in some way, which is commonly understood to be 'wearable' technology. As used herein, the terms "user" and "partner" are not intended to any specific individual or groups of individuals, rather the terms depend on the nature of the relationship between the individual or groups of individuals. For example, a user may also be partner depending on whether the individual is providing, or receiving data from another individual or group of individuals. Accordingly, the terms may be interchangeable depending on the nature of the relationship.

In the following description, numerous specific details are set forth, such as, but not limited to, examples of specific data signals, components, connections, displays, configurations, etc. in order to provide a thorough understanding of the present invention. It will be apparent, however, to one skilled in the art that the present invention may be practiced without these specific details. In other instances, well known components or methods have not been described in detail but rather in block diagrams in order to avoid unnecessarily obscuring the present invention. Thus, the specific details set forth are merely exemplary. The specific details may be varied from and still be contemplated to be within the spirit and scope of the present invention.

Overview

In an exemplary embodiment, a method for integrating delivered information in a Life Based VR experience is disclosed. The method comprises enabling a user to register and become a member of a Life Based VR system based on custom delivered information. Information is integrated based on parameters the user provides about the user's life which is also known as a life state as disclosed in U.S. Pat. No. 8,484,098, titled, "System for Information Delivery Facilitating Partner Rating of Users and User Ratings of Partners"; US Patent Publication No. U.S. 2013/0275445, titled, "Information Delivery System"; US patent Publication No. U.S. 2015/0261386, titled, "Information Based Life View"; and US patent Publication No. U.S. 2015/0261401, titled, "Information Based Life View", each which is incorporated by reference in its entirety. The user's life state may span many areas including at least demographic information, health information, ethnic information, social information, behavioral information, and psychological information. The user may grant third parties permission to integrate information to the user's Life Based VR experience. The third parties are also members of the information delivery system, which in turn are allowed to deliver information to the user's Life Based VR experience. The third parties may use the user's life state to filter and integrate information for the user.

The present invention also relates to apparatus for performing the operations herein. This apparatus may be specifically constructed for the required purposes, or it may comprise a general purpose computer. One or more apparatus or general purpose computers may be used either directly or indirectly in conjunction with one another. The general purpose computer may be coupled with various VR input/output (I/O) devices and selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled with a computing system bus. Portions of any modules or components described herein may be implemented in lines of code in software, configured logic gates in software, or a combination of both, and the portions implemented in software are tangibly stored on a computer readable storage medium. The algorithms and displays presented herein are not inherently related to any particular computer, mobile device, equipment, display, or similar system or apparatus. Various general purpose systems may be used with programs in accordance with the teachings herein, or it may prove convenient to construct more specialized apparatus to perform the required method blocks. The required structure for a variety of these systems will appear from the description below.

Computer System

FIG. 1 illustrates a block diagram of an example computing system environment 100 that may use an embodiment of one or more of the virtual reality applications discussed herein, in accordance with some example embodiments. The computing system environment 100 is only one example of a suitable computing environment, such as a client device or Virtual Reality device, and is not intended to suggest any limitation as to the scope of use or functionality of the design. Neither should the computing system environment 100 be interpreted as having any dependency or requirement relating to any one or combination of components illustrated in the exemplary computing system environment 100. Embodiments of the invention may be implemented on any type of computer, device, apparatus, or even machine that make use of the computing system environment 100. For example, the device may be a virtual reality device that displays the user's medical history or current conditions.

The design is operational with numerous other general purpose or special purpose computing system environments or configurations. Examples of well-known computing systems, environments, and/or configurations that may be suitable for use with the design include, but are not limited to, personal computers, server computers, VR devices, VR headsets, VR goggles, hand-held or laptop devices, head or body mounted displays, multiprocessor systems, microprocessor-based systems, set top boxes, programmable consumer electronics, network PCs, minicomputers, mainframe computers, distributed computing environments that include any of the above systems or devices, automotive and informational appliances, or the like.

The design may be described in the general context of computing device executable instructions, such as program modules, being executed by a computer. Generally, the program modules include routines, programs, objects, components, data structures, etc., that perform particular tasks or implement particular abstract data types. Those skilled in the art can implement the description and/or figures herein as computer-executable instructions, which can be embodied on any form of computing machine readable media discussed below.

The design may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary computing system environment 100 for implementing the design includes a general-purpose computing device in the form of a computing device 110. Components of computing device 110 may include, but are not limited to, a processing unit 120 having one or more processing cores, a system memory 130, and a system bus 121 that couples various system components including the system memory to the processing unit 120. It is possible for some embodiments of the invention to have a computing system environment 100 that entails memory and display functions without a processing function. By way of a non-limiting example, a third party may provide customized information to a user, which is relayed to a device for display only with no data manipulation necessary. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus, or the like.

Computing device 110 typically includes a variety of computing machine readable media. Computing machine readable media can be any available media that can be accessed by computing device 110 and includes both volatile and nonvolatile media, removable and non-removable media. By way of example, and not limitation, computing machine readable mediums uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Communication media typically embodies computer readable instructions, data structures, program modules, or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable volatile/nonvolatile computer storage media. By way of example, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, or the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter or receive information, execute commands or configuration changes, or the like with the computing device 110 through the user input interface 160, VR interface 190, output peripheral interface 195, or remotely via the network interface 170. The VR interface 190, output peripheral interface 195, or user input interface 160 may be coupled with the computing device 110 via a system bus 121. The VR interface 190, output peripheral interface 195, or user input interface 160 may be coupled with various input/output (I/O) devices with which a user may enter or receive information, execute commands, or the like. Such I/O devices may include by way of non-limiting examples, VR devices 191, keyboard 162, microphone 163, pointing device 161, speakers 197, or printer 196. The printer 196 may be either a two dimensional or three dimensional printer. The pointing device 161 may include, by way of a non-limiting example, such as a mouse, trackball or touch pad. In some embodiments, the I/O devices may include a motion sensor or similar device, which allows the user to provide gesture or motion inputs to the computing device 110. Other I/O devices (not shown) may include a joystick, game pad, satellite dish, scanner, body mounted device, or the like.

In some embodiments, the VR devices 191 may include at least one device configured to present information to a user in the form of visual, auditory, chemical, or kinesthetic signals. By way of non-limiting examples, such devices may include stereoscopic displays for displaying three dimensional images, stereo or 'surround sound' speaker systems, devices for emitting one or more volatile chemicals that may have a distinctive smell or flavor, or devices that produce or respond to various tactile or motion based signals. Such devices may also produce various neurological signals that are designed to emulate or enhance visual, auditory, chemical, or kinesthetic signals.

By way of a non-limiting example, the computing system environment 100 may provide an immersive experience to the user. For example, the VR devices 191 may be a display having a wide field of view so that the user feels they are surrounded by the experience. A complete 360-degree view may be provided to the user, allowing the user to orientate their head or body to view or not view certain information. Alternatively, a wide viewing angle may allow a user to view various information at the same time, for example, a user may view multiple portals or VR life states simultaneously. By way of a non-limiting example, by providing a different view to each eye (e.g., a stream of left panoramic images for left eye viewing and a stream of right panoramic images for right eye viewing), the computing system environment 100 may give the user a stereoscopic or three-dimensional view of the information. Non-limiting examples of virtual reality displays include stereoscopic displays, holographic displays, virtual reality googles, augmented reality glasses, televisions, smartphones, tablets, or the like.

By way of non-limiting examples, VR devices 191 may include, or used in conjunction with an audio output device or speakers 197. In this way, three-dimensionally surrounding sound may be provided to the user. Non-limiting examples include active or passive headphones, speakers, multi-channel speaker systems and associated amplifiers, or the like. Sound may be altered based on the user's head orientation to augment the immersive three-dimensional viewing experience. For example, if a user turns from one direction to another, the sound from a first direction may be muted, lowered, or altered to appear to be emanating from behind the user. By way of non-limiting examples, VR devices 191 may include devices for emitting one or more volatile chemicals that may have a distinctive smell or flavor. These devices may emit certain chemicals or combinations thereof to further enhance the VR experience.

By way of non-limiting examples, VR devices 191 may include devices for making physical contact with the user in order to make the VR experience more realistic. For example, VR devices 191 may include gloves for providing the user with tactile sensations that correspond to virtual reality content and when the user reaches out to touch either a real or a virtual object, the computing system environment 100 provides pressure or vibrations that make it feel like the user is making physical contact with the object.

The computing device 110 may use data from various sensor input devices (not shown) to track the orientation of a user or parts of the user. For example, the computing device 110 may be coupled with one or more GPS receivers, accelerometers, gyroscopes, or the like, used to detect movements or a change in orientation of the user's body, head, limbs, or combinations thereof. It is contemplated that any movement of the user including, by way of non-limiting examples, changes in geographic location, movements of parts of the user relative to the same or another user, or individual muscle twitches fall within the scope of what is considered movement. The computing device 110 may then alter the information displayed within the VR environment. Auditory, chemical, or kinesthetic information may similarly be modified based on the orientation of the user's body, head, or limbs.

In some embodiments the computing device 110 may be coupled with other I/O devices (not shown), these may garner data from sources other than directly from the user. These sensors may include, by way of non-limiting example, distance sensors, motion sensors, location sensors, global positioning systems (GPS), accelerometers, gyroscopes, or the like. These and other I/O devices, may be connected to the processing unit 120 through, for example the user input interface 160, output peripheral interface 195, or the VR interface 190, which are coupled to the system bus 121, but they may be connected directly or indirectly by way of other interface and bus structures. Such interface and bus structures may include parallel port, game port or a universal serial bus (USB). It is further contemplated that the I/O devices and/or the VR interface 190, output peripheral interface 195, or user input interface 160 may operate autonomously or as extensions to other systems which then communicate with the computing device 110 remotely, either via wired or wireless communication means.

The computing device 110 may operate in a networked environment using logical connections to one or more remote computers, such as a remote computer 180. The remote computer 180 may be a personal computer, a handheld device, VR system, a server, a router, a network PC, a peer device or other common network node, and typically includes many or all of the elements described above relative to the computing device 110. The logical connections depicted in FIG. 1 include a local area network (LAN) 171 and a wide area network (WAN) 173, but may also include other networks. Such networking environments are commonplace in offices, enterprise-wide computer networks, intranets, extranets, and the Internet. A browser, device, or system application may be resident on the computing device and stored in the memory.

When used in a LAN networking environment, the computing device 110 is connected to the LAN 171 through a network interface or adapter 170. When used in a WAN networking environment, the computing device 110 typically includes a communication module 172 or other means for establishing communications over the WAN 173, such as the Internet. The communication module 172 may be a modem used for wired, wireless communication or both. The communication module 172 may be internal or external, may be connected to the system bus 121 via the user input interface 160, or other appropriate mechanism. In a networked environment, program modules depicted relative to the computing device 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present design can be carried out on a computing or VR system such as that described with respect to FIG. 1. However, the present design can be carried out on a server, a VR system, a computer devoted to message handling, or on a distributed system in which different portions of the present design are carried out on different parts of the distributed computing system.

Another device that may be coupled to system bus 121 is a power supply such as a battery and Alternating Current adapter circuit. As discussed above, the DC power supply may be a battery, a fuel cell, or similar DC power source that needs to be recharged on a periodic basis. It will be appreciated that other forms of power supply may still be contemplated to be within the spirit and scope of the present disclosure. For wireless communication, the communication module 172 may employ a Wireless Application Protocol to establish a wireless communication channel. The communication module 172 may implement a wireless networking standard such as Institute of Electrical and Electronics Engineers (IEEE) 802.11 standard, IEEE std. 802.11-1999, published by IEEE in 1999. Other wireless communication methods that may also be used and may include Bluetooth, gigabit, Wi-Fi, Radio Frequency, infrared, or the like. It will be appreciated that other forms of wired and wireless communications may still be contemplated to be within the spirit and scope of the present disclosure.

Network Environment

Figure 2:
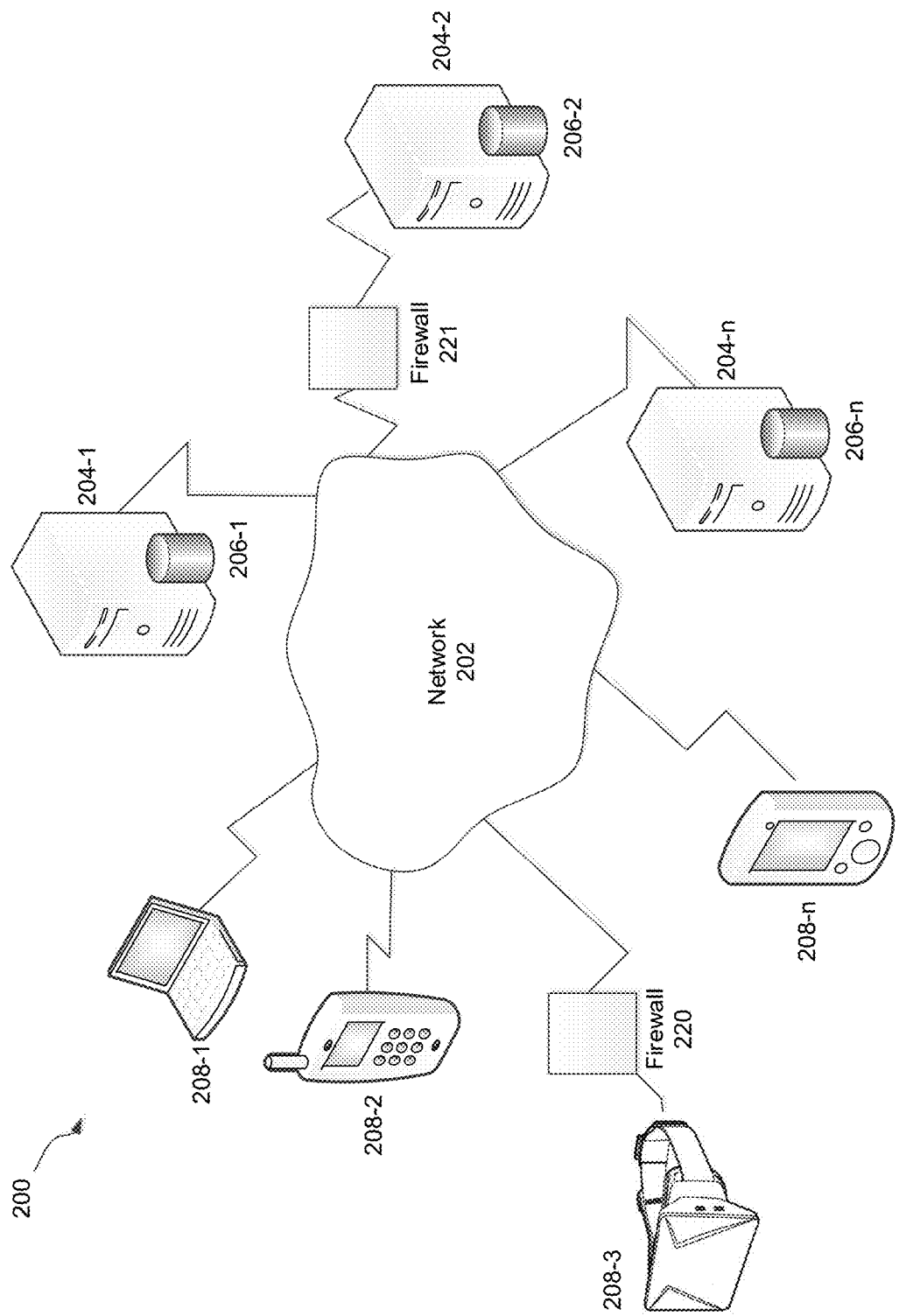
FIG. 2 illustrates an exemplary network that may be used to pull filtered information, in accordance with the present disclosure.

FIG. 2 illustrates a network environment 200 in which the techniques described may be applied, in accordance with some example embodiments. The network environment 200 has a network 202 that connects server computing systems 204-1 through 204-n, and at least one or more client computing systems 208-1 through 208-n. It will be appreciated that a client computing system 208-1 through 208-n may include any VR system, AR system, holographic imaging device, laptop computer, gaming system, cell phone, 'smart' phone, personal digital assistant, or similar device capable of providing a Life Base VR experience. As shown, there may be many server computing systems 204-1 through 204-n and many client computing systems 208-1 through 208-n connected to each other via a network 202, which may be, for example, a centralized network, a decentralized network, intranet, internet, 'cloud' based network, or the like. Note, that alternatively the network 202 might be or include one or more of: an optical network, the Internet, a Local Area Network (LAN), Wide Area Network (WAN), satellite link, fiber network, cable network, or a combination of these and/or others. It is to be further appreciated that the use of the terms client computing system and server computing system is for clarity in specifying who initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 208-1 and the server computing system 204-1 can both initiate and respond to communications, their communication may be viewed as peer-to-peer. Likewise, communications between the client computing systems 208-1 through 208-n and the server computing systems 204-1 through 204-n may be viewed as peer-to-peer if each such communicating device is capable of initiation and response to communication. One or more of the server computing systems 204-1 through 204-n may be associated with a database such as, for example, the databases 206-1 through 206-n. A firewall such as, for example, the firewall 220 between a client computing system 208-3 and the network 202, may be used to protect data integrity. Another firewall example is the firewall 221 positioned between the server computing system 204-2 and the network 202. Although not shown, other devices (e.g., proxy servers, etc.) may also be connected to the network 202.

FIG. 2 also illustrates a block diagram of an embodiment of a server computing system to provide information. A user via a VR system from the client computing system 208-3 may interact with the server computing system 204-1, and then supply input to the query/fields and/or service presented by a VR system interface of the application. The VR system parameter may be served by a server computing system 204-1 in any language using any wireless communication protocol to any enabled client computing system 208-3 or any equivalent thereof. Non-limiting examples of wireless communication protocols include Wireless Access Protocol (WAP), Bluetooth, near-field communication, or the like.

In an exemplary embodiment, the client VR computing system 208-3 is shown as a VR headset, however computing system 208-3 may also be a smart phone, a touch pad, a laptop, a netbook, etc. It is contemplated that a VR system parameter may be served from another computing system 208-1 through 208-n, such as a laptop or mobile device, or it may be initiated from the VR system itself. The computing system 208-3 may host a VR system to interact with the server computing system 204-1. Each application, widget, plug-in, etc. has a code scripted to perform the functions that the software component is coded to carry out such as presenting fields and icons to take details of desired information. For example, the Life Based VR applications may be hosted on the server computing system 204-1 and served to the VR system of the client computing system 208-3. The applications then integrate information that allows the use of user information and further detail that allows a more detailed and user relevant Life Based VR experience.

Any application and other scripted code components may be stored on a computing machine readable medium which, when executed on the server causes the server to perform those functions. In an embodiment, the software used to facilitate the functions and processes described herein can be embodied onto a computing machine readable medium such as computer readable medium. As discussed above a computing machine readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the computing machine readable medium may be used in the process of creating the apparatuses and/or methods described herein.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, SQL, Java, or other variants of such or similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be noted that the configuration of the diagram illustrated in FIG. 2 is for illustrative purposes only, and the actual configurations may vary. It is contemplated that various configurations of servers, firewalls, clients, devices, or the like fall within the scope of the present invention. It is also contemplated that similar computing devices may also fall within the scope of the present invention which may include VR equipment, iPads, 'wearables', vehicle 'infotainment' systems, TV devices, or the like.

It will be appreciated, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

Information Based Virtual Reality

As the VR and various methods of experience and interaction modes continue to evolve into a more visceral, customized, expansive, and relevant mode of interaction, there remains a significant gap between what the users want and what or how the experiences are delivered to and experienced by the users. Information is integrated into various experiences on a very limited basis. Current VR experiences have many limitations that embodiments of the present invention address. Following are some of the factors regarding the limitations of the current VR experiences: (a) VR experiences are limited by the software that creates the experience, when the software does not integrate information about a user's life; (b) It is almost impossible to integrate accurate and customized information in a way that will yield a Life Based VR experience exactly representative of the user's life; (c) Even if accurate information is integrated, changes in the user's Life State or the information environment may cause what is considered accurate during one time period to become inaccurate during another time period; (d) Because of a user's privacy rights, the information integrated into a customized VR experience will always be inadequate by failing to accurately take into consideration factors hidden or limited by the privacy rights; (e) Because of privacy rights, the information integrated into VR experiences will be invasive to a user's privacy rights, as the current method of managing privacy rights is flawed; f) There are no user feedback mechanisms to bilaterally advise the VR experience information providers of their accuracy, allowing the providers to more effectively tailor their results for each user; (g) Since the number of organizations and indexed information is theoretically infinite, there are insufficient mechanisms that causes the providers of customized Life Based VR information to use a method of continuous improvement and focus to yield fewer more relevant integrated information. Instead, there is the appearance of some relevant information that has varying degrees of accuracy; (h) There are insufficient methods or instruments that allow information in a VR experience to change, update, or morph according to the user's informational requirements (driven by the user's situation, query criteria, or changes that modify the relevance of the query or VR experience); (i) There are insufficient methods or instruments that allow the structure, sequencing, and order of the components and sections of the VR experience to change, reorder, or rehash what or how the information is integrated, according to the user's information requirements (driven by the user's situation, query criteria, or changes that modify the relevance of the query or VR experience); (j) There are no feedback mechanisms that convey to the user the relevance and accuracy of the information integrated, as compared to the user's Life State and situation, which is integrated into the user's VR experience.

Embodiments of the invention fully utilize the information about a user's life to enable the integration of filtered and customized information, through dynamically changing areas within the Life Based VR experience, according to the changes in the user's life, to the users. The information about the user's life is also referred to as a life state, while how the information is used, displayed, integrated, ordered, and filtered is referred to as the Life Based VR experience. The life state may consist of many categories, which are dynamically used and updated by the life state, life view, information marketplace, or Life Based VR experience. The life state information included in the Life Based VR experience may be prioritized based on the alignment accuracy of the life state information, alternatively the user or the partner may use the Life Based VR experience to custom define at what priority the information is pulled from the life state. For example the user may want the Life Based VR experience to use the most accurate information value, or the value from one or more certain partners. A user may grant third parties access to the user's life state by setting security features and gatekeeping features. As will be described, embodiments of the present invention may include an information delivery system that integrates filtered information to the user Life Based VR experiences. The information delivery system enables third parties to have access to the users' life states, as allowed in transactions between the users and the third parties. Each user is associated with a unique life state. The life state is used as filters or as a basis for customized services (e.g., web sites, VR applications, emails, etc.). A user may also update the life state by way of the Life Based VR experience. Embodiments of the invention also include an architecture that includes a centralized server computer system connected to the Internet and configured to deliver information to the users. The centralized server computer system is referred to herein as an information delivery server. The information delivery server may be configured to provide the users a life state interface to enable the users to provide the values for the attributes and sub-attributes associated with their life states. The information delivery server is coupled with a database configured to store the values for the attributes and the sub-attributes. The information delivery server is configured to provide the users an interface to configure their own VR experiences, which are referred to as the users' Life Based VR experiences. The users may use their Life Based VR experiences to view, integrate, add, delete, or modify the filtered information. In some embodiments, the filtered information may be displayed in a users' Life Based VR in the form of avatars. An avatar may represent a user's life view, a partner, or a combination or group of other users and partners. The avatars may be a graphical representation of the user or the user's alter ego or character. The avatar may be fanciful (e.g., a graphical representation of the user that does not look like the user in real life) or realistic (e.g., a graphical representation of the user that looks similar or has some similar characteristics of the user in real life). Realistic avatars may be photorealistic or merely suggestive of the user as the user exists in real life. The avatar may be used to display some or all of the information about the user. The avatar may also change according to information provided by the user, one or more partners, Life State, or Life Based VR. The user may be able to control the movement of their avatar by their body movement, head movement or facial expression. For example, if a user moves a portion of their body in the real word system may cause the avatar to move a corresponding portion of its body in the VR environment. The information delivery server may also be configured to enable the users and the third parties to rate one another. Replication may be involved to make access, delivery and update operations by the information delivery server more efficient.

Life Based VR Experience

Figure 3A:
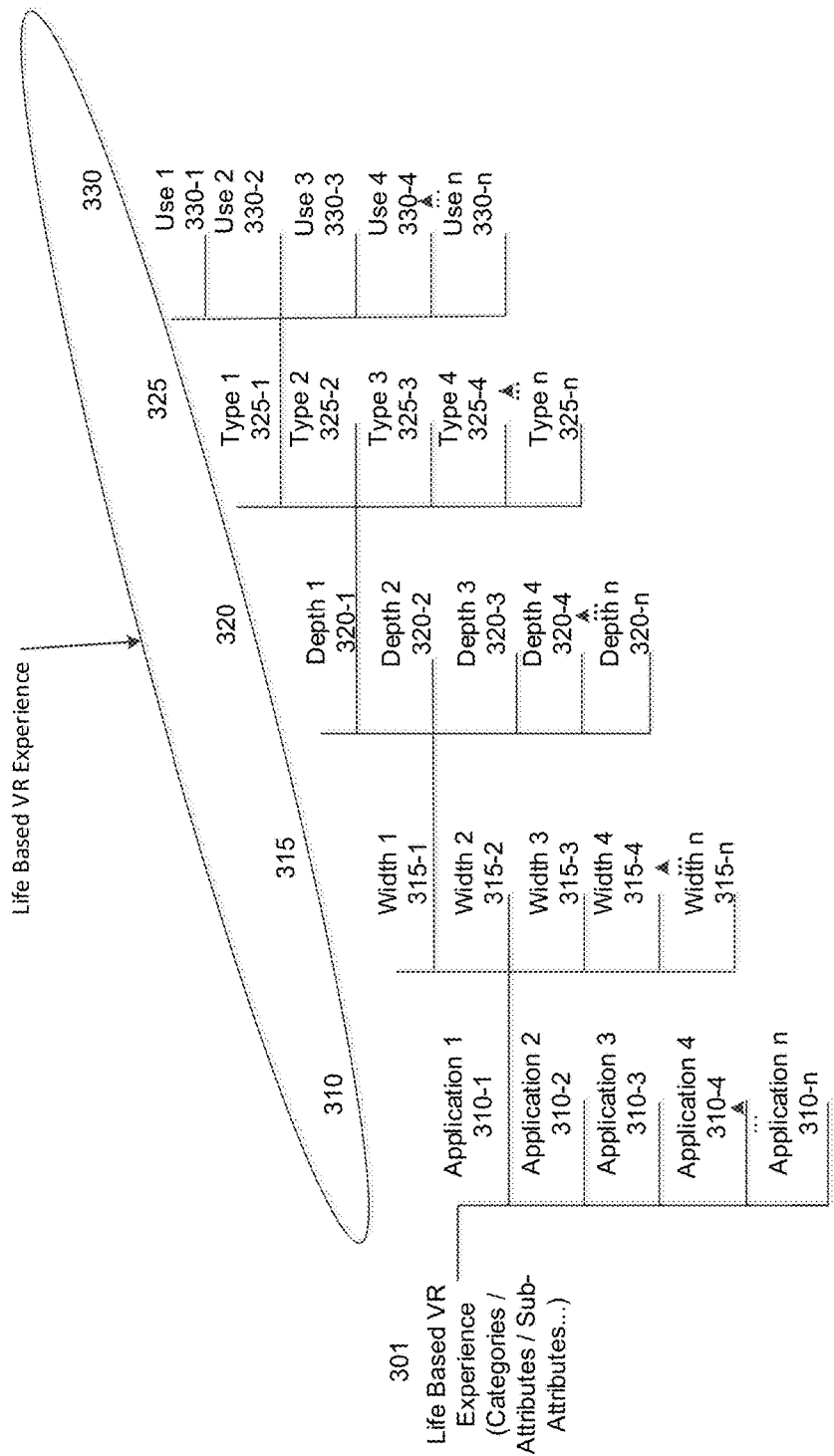
FIG. 3A illustrates an exemplary structure of the Life Based VR experience, in accordance with the present disclosure.

FIG. 3A illustrates an example structure of a Life Based VR experience 301, in accordance with some embodiments. According to defined applications, widths, depths, types, and uses, a Life Based VR experience 301 may integrate many category sections, custom category sections, or dynamic category sections, as defined in a life state. Each category section may consist of many attributes. Each attribute may consist of many sub-attributes. Together, the category sections, the attributes, and the sub-attributes may conceptually integrate information about the user for many different VR experiences. The category sections, attributes and sub-attributes may be related to one another in a top-down relationship and/or laterally—enhancing the interpretations of each attribute value. The category sections, the attributes, and the sub-attributes may be displayed as defined by the user's criteria, Life State, the information delivered, and the information integrated. In some embodiments, they may also vary based on standards and changes by industry authorities, since industry authorities play a major role in delivering information to a user's Life State.

Referring to FIG. 3A, the Life Based VR experience 301 may consist of applications 310-1 through 310-n. Although not illustrated, an application may consist of many deeper levels of applications. For example, under the application 1 310-1, there may be application 1.1, application 1.2, application 1.1.2, application 1.1.3, etc. The applications that are connected each category, attribute, or sub-attribute will determine which applications are enabled for the Life Based VR experience. For example, for application 1 310-1, the Life Based VR experience may integrate all categories, attributes, and sub-attributes; for application 2 310-2, the Life Based VR experience may integrate only a specific sport (sub-attribute), for sports (attribute), in the entertainment category. The applications that are connected to each category, attribute, or sub-attribute also determine how the applications will integrate the categories, attributes, and sub-attributes. For example, for application 3 310-3, the Life Based VR experience may integrate only categories, attributes, and sub-attributes that were derived from a certain information provider. For example, for application 4 310-4, the Life Based VR experience may integrate only categories, attributes, and sub-attributes that are allowed by the security and gatekeeping attributes of a Life State. A Life Based VR experience derives multiple categories, attributes, and sub-attributes from a life state.

A life state may consist of multiple widths 315-1 through 315-n. It is envisaged that each of the many aspects of a user's life can be mapped to a category of the life state, which may be specified by the width, which determines how many categories, attributes, and sub-attributes will be used in the Life Based VR experience. Each of the widths 315-1 to 315-n may consist of many depths 320-1 to 320-n and types 325-1 to 325-n. Although not illustrated, each of the types 325-1 to 325-n may consist of many deeper levels of types. For example, under the type 1 325-1, there may be sub-type 1.1, sub-type 1.2, etc. The categories, attributes, and/or sub-attributes may be dynamic and may be integrated by a Life Based VR experience, according to the widths. For example, new categories, attributes, and/or sub-attribute values may be added, removed, or moved to another category, attribute, or sub-attribute. The width definition that is connected to that category, attribute, or sub-attribute will determine how many attributes and sub-attributes under a category are used. The ability to use the updated categories, the attributes and the sub-attributes illustrate the dynamic nature of the Life Based VR experience.

Depths may alter how and to what extent a Life Based VR experience integrates life state application categories, attributes, and sub-attributes. The depths determine how many levels or how deep a given category, attribute, sub-attribute, and sub-attribute (n) are used in the Life Based VR experience. The depths may also use information about a user's life state preferences that is mutually exclusive of life state categories, attributes, and sub-attributes. Depths may also be used in combination with each other. By way of non-limiting examples, depths may include the following: There may be a depth "Sports" which may be used to integrate the user's life state for life state category, attribute, or sub-attribute information relating to sports and professional teams where the user is an active fan. The Life Based VR experience application may integrate information, feedback, graphics, athletes, and other aspects of the user's favorite sports and teams, into the experience. "Entertainment Social Integration" depth may be used to integrate the categories, attributes, and sub-attributes (n) relating to various relationships in the user's life state information relating to forms of entertainment such as gaming, where the user's life state relationships and group affiliations participate in a gaming Life Based VR experience. A depth "Injuries" may be used to integrate categories, attributes, and sub-attributes (n) relating to the user's injuries and injury related health information, where the user's life state health records, injuries, progress, adverse events, medications, and other medical information participate in a medical Life Based VR experience. Depths may also be used in combination with each other. For example, there may be depths "Travel History" and "Social Integration", where the "Travel History" depth may integrate a user's life state category, attribute, or sub-attribute (n) relating to locations a user has traveled to, and the "Social Integration" depth may integrate a user's life state category, attribute, or sub-attribute (n) relating to the user's social relationships, where a travel oriented Life Based VR experience may integrate the user's travel experiences, such as highlighting known restaurants, hotels, attractions, as well as other persons the user interacted with and/or the other persons that the user has a social or professional relationship with.

Applications, widths, depths, types or uses may have dates they are effective or not effective, active or not active, and other criteria that may relate to, for example, the depth, a relationship with one or more other depths, or relationships with categories, attributes, or sub-attributes from the user's life state. For some embodiments, the values for the depths, categories, attributes and sub-attributes may be automatically provided. Other example categories, attributes, or sub-attributes are included in the corresponding provisional application which is described in the related application section at the top of this document.

As the user's life changes, the values for the user's life state, categories, attributes, sub-attributes may be updated, which may update the user's Life Based VR experience as the life state, categories, attributes or sub-attributes change, the application, width, depth, type, and use may determine how and if the life state, category, attribute or sub-attribute information is integrated into the user's Life Based VR experience. For a given Life Based VR experience application, width, depth, and type, the use determines how the life state information is used and integrated into the Life Based VR experience. The use may include parameters for specific modes, mechanics, or areas that the Life Based VR experience integrates the life state information. For example, the user may determine the categories, attributes, or sub-attributes that may be integrated because of Life Based VR parameters or program settings, or according to the user's life, which may be determined by information in the user's categories, attributes, or sub-attributes, or by a date or range of dates, by current events, by aging, by affiliations, memberships, hereditary relationships, social relationships, professional relationships, event outcomes, physical states, location, or other life related states. For some embodiments, the use may allow categories, attributes and sub-attributes may be automatically integrated. For example, a user's Life Based VR experience may include virtual classroom training, and the use may define that classmate selection factor in the relationship of the user to the classmates, but instructor selection does not factor in any of the user's learning habits, history, or education. In another example, the Life Based VR experience may include a virtual medical consultation with a doctor, where the use determines that health based attributes will be factored into a diagnosis and prognosis, while psychological based attributes are only factored into the diagnosis. The number of combinations of categories, attributes, and sub-attributes (and deeper levels of sub-attributes) may be extensive, and may be used by the Life Based VR experience applications, widths, depths, and types concerning the life of a user. It may be noted that this is different from the current traditional VR systems since the information included in a traditional VR system is very limited and only changes based on some discrete user-defined and simple and static program parameters. For example, a traditional VR program may display a virtual gaming experience. Following in example, the gaming experience may display characters that the program define according to programmatic parameters isolated from the user's life. Continuing to follow on this example, the Life Based VR parameters may be enhanced to define characters and their behavior based on certain user specific life based categories, attributes and sub-attributes that are specifically relevant to the user, as may be defined in the user's life state. An option may be provided to enable the users to select using the automatic setting of Life Based VR experience parameters. For example, a new user may select this option to speed up the process of setting up the user's Life Based VR experience. The user may then update the Life Based VR experience settings and values as necessary. The Life Based VR experience may be configured to provide interview tools, wizards, or applications that gather and map the information about the life state to the relevant categories, attributes and sub-attributes, by using applications, widths, depths, types, and uses.

Figure 3B:
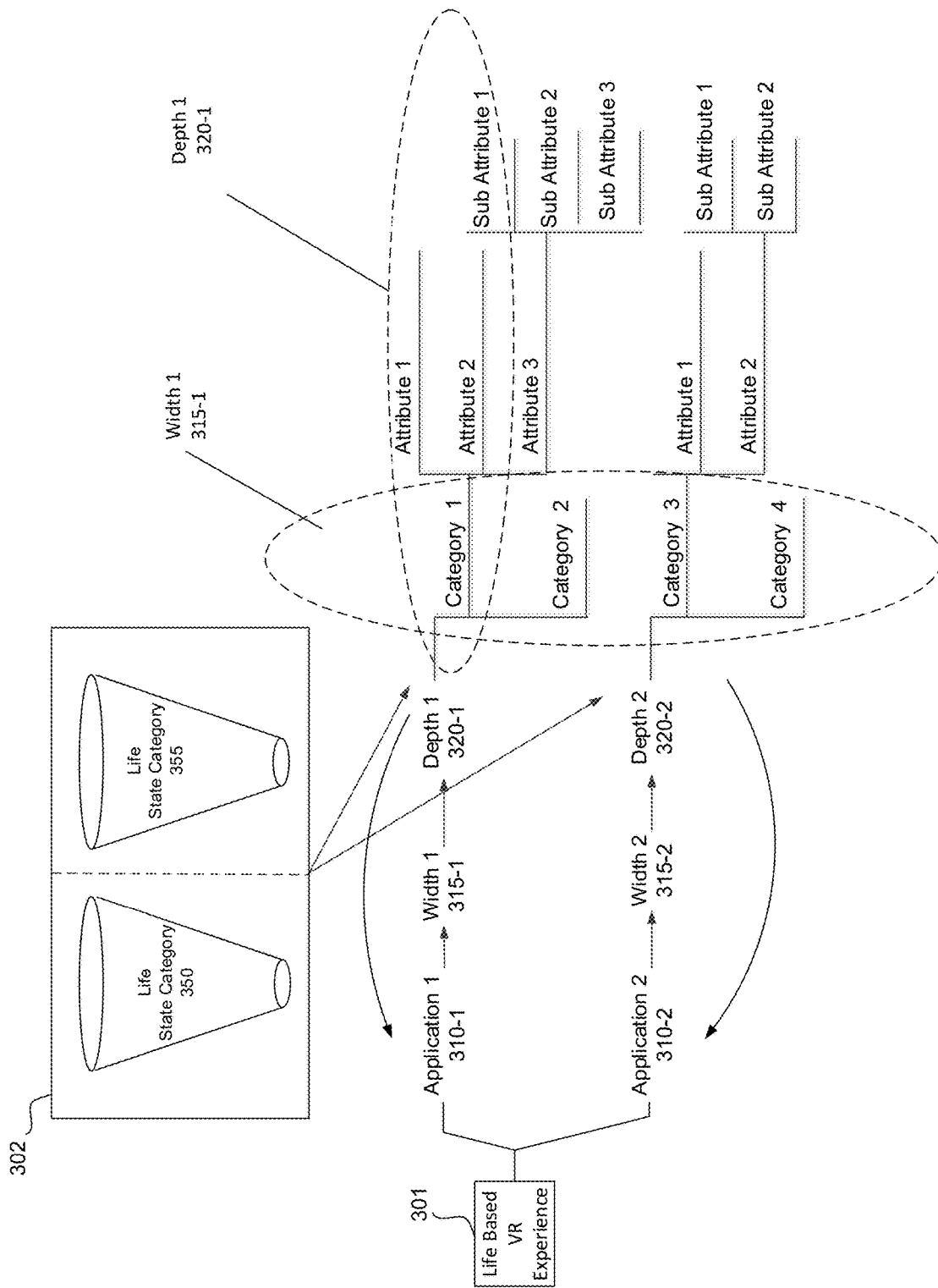
FIG. 3B illustrates an exemplary collection life states, in accordance with the present disclosure.

FIG. 3B illustrates an example of a Life Based VR experience 301, in accordance with some embodiments. The Life Based VR experiences 301 and life states 302 may represent the Life Based VR experiences and states of many users. The Life Based VR experience is derived from the life state information. In the current example, the collection of Life Based VR experience 301 includes life states 302, which includes the life states 350 and 355. The funnel shape associated with each of the life states 350 and 355 illustrates the concept of using a life state to funnel or filter the information into the Life Based VR experience 301. The life state also helps funneling the information available from the third parties so that only filtered information is integrated by third parties. In other words, the life state enables user information and third parties to integrate the right type of information to the user's Life Based VR experience. The application, widths, and depths determine how information is integrated in each Life Based VR experience. Applications, widths, and depths may be defined, use information in a category, attribute, or sub-attribute from the life state 302. For example, a user may define a Life Based VR experience application to integrate life state information into a virtual trip to Los Angeles, and the width and depth may define more detailed specific life state information, such as weather preferences and favorite locations of interest, according to the life state 302 information.

The Life Based VR experience 301 may also be used in other VR or integrations of a user's information. In the case of other VR experiences or systems, the Life Based VR experience enables other VR systems to integrate customized information that may include information and life state settings matching what is relevant to the user's VR experience at that moment. In the case of other systemic interactions using the life state engine, the Life Based VR experience may enhance the user's experience by integrating customized life state information.

Figure 3C:
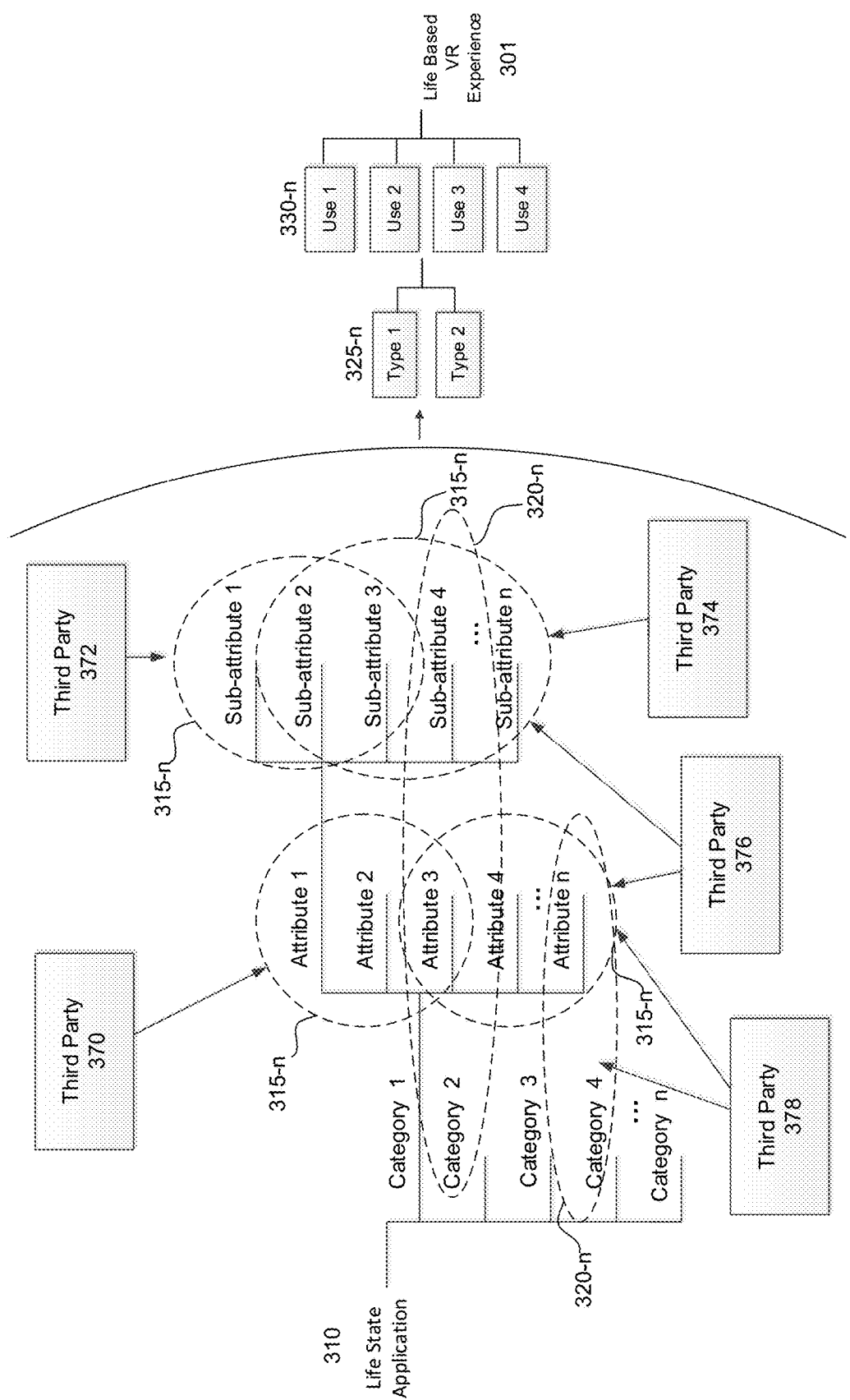
FIG. 3C illustrates an example of granting access to the Life Based VR experience, in accordance with the present disclosure embodiments.

FIG. 3C illustrates an example of third party information being delivered to the user's Life Based VR experience with some embodiments. A user has complete control how the access to the user's Life Based VR experience is integrated. The information that is integrated is controlled by the life state applications 310, widths 315-$n$, depths 320-$n$, types 325-$n$, and uses 330-$n$. According to these settings, the integration can be at the category level, the attribute level, the sub-attribute level, or combinations thereof. A third party can be granted permission to interact with and provide information for various areas of the user's life state. The third party uses and delivers information to the user according to the life state security and gate keeping attributes.

As illustrated, the life state is populated with information delivered by third parties 370, 372, 374, 376, and 378. The arrows from the third parties to the user's categories, attributes, and sub-attributes indicate information integrated by the user's Life Based VR experience, according to the user's application, width, depth, security and gatekeeping attributes defined in the life state. The types 325-$n$ may determine the different types of integrations regarding the information integrated into the Life Based VR experience. For example, the type may determine that the life state information is used: a) as a required component to create a Life Based VR experience, b) as an optional component to enhance a Life Based VR experience, or c) as a designation of the area of VR system applicability (such as visual rendering, sound, informational, etc.). The types 325-$n$ may define other settings regarding the type of integration the information is used for. The uses 330-$n$ may determine conditions, characteristics, frequencies, and other parameters regarding the method the information is integrated with and used by the user's Life Based VR experience 301. For example, the use may define that a mandatory type such as specific demographic information, which is set by the use to be integrated during initial set up of a given Life Based VR experience. The Life Based VR experience may access and integrate information directly from the user's life state, or dynamically from multiple third parties, as defined by the third parties 370, 372, 374, 376, 378, and by life state settings that determine life base VR parameters, information quality, gatekeeping, and security attributes and sub-attributes. The Life Based VR experience may also include factoring in information quality and alignment. For example, a user may select to integrate new product introductions relating to laptops for Life Based VR applications that include advertisements, and the third party that integrates the information to the Life Based VR experience with the highest alignment and quality relating to the user's life state may be selected in the category, attributes, and sub-attributes as the highest priority to integrate information in a given Life Based VR experience.

Figure 3D:
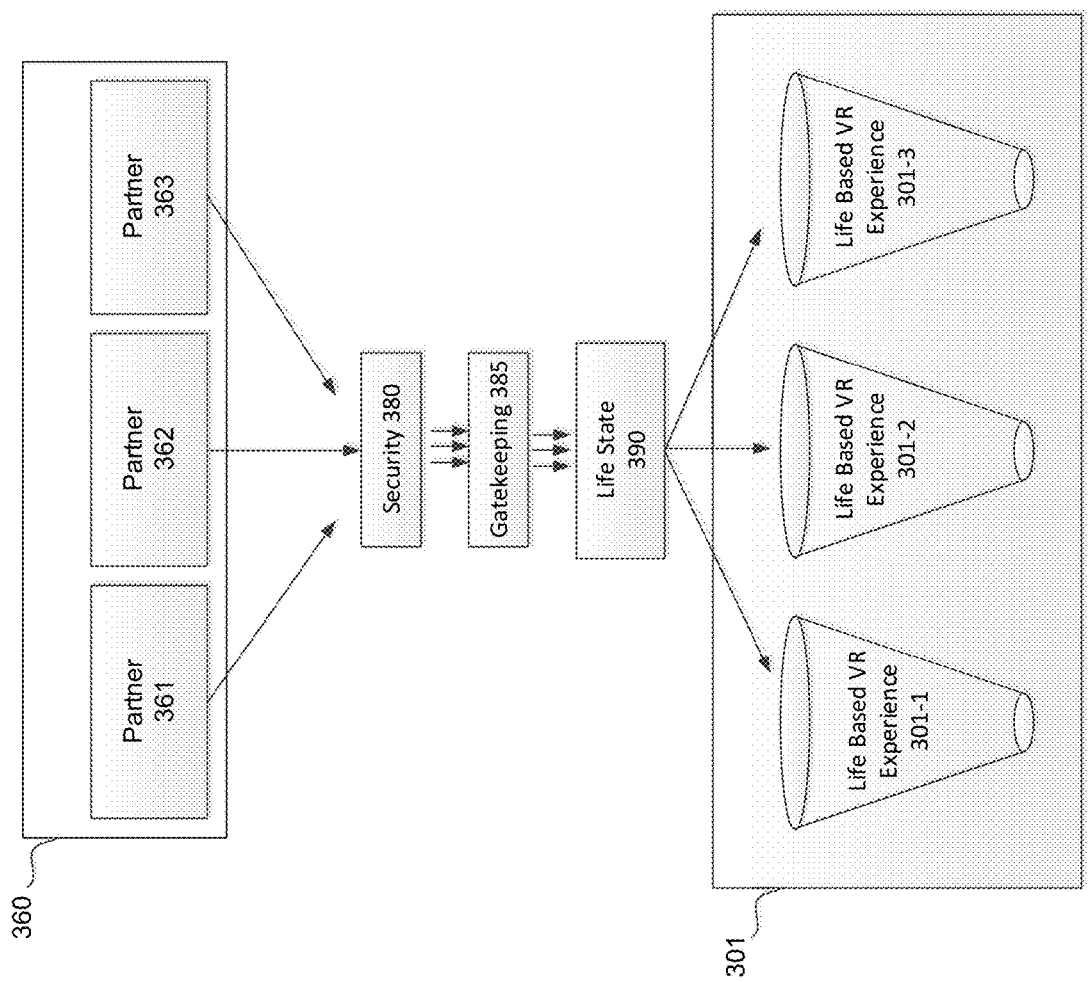
FIG. 3D illustrates an exemplary diagram of a group of partners, in accordance with the present disclosure embodiments.

FIG. 3D illustrates an example diagram of a group of partners 360, in accordance with some embodiments. The diagram includes Life Based VR experiences 301 similar to the Life Based VR experiences 301 described with FIG. 3B. For some embodiments, a third party may have to be approved before it can be granted permission to one or more access groups, where a Life Based VR experience may integrate information from those access groups. A set of criteria may be used to evaluate and approve a third party. The set of criteria may be determined by a management team or an administrator associated with the information delivery system, which in turn supplies the Life Based VR experience with information. For example, the criteria may include one or more of the following: the ability of the third party to provide information to the users according to their life states, the type of service and information that the third party is offering and whether they map to the categories, attributes and sub-attributes defined by the life state structure, the ability of the third party to map its services and information to the life state structure, the reputation of the third party, the likelihood that the third party will continue to perform as a partner and a leader in the category/attribute/sub-attribute that it is assigned to, etc. Other criteria may also be used. This criteria determines the extent, quality, and type of information that is supplied to the Life Based VR experience, through the life state.

Once a third party is approved, it becomes a partner 360. It will be appreciated that the terms "user" and "partner" are defined based on the nature of the relationship and not are inert categories assigned to individuals or groups. For example, a user of the system may also be a partner in the user-partner relationship to another user of the system. Accordingly, an individual or group of individuals using the system may be both a user and a partner depending on the nature of the relationship with the other user. Once a third party becomes a partner 360, a license may be granted to the third party. The license may give the third party permission to copy the users' life states for a defined period. There may be an expiration date, and the license may need to be renewed. The third parties use the copies of the life states to filter its information, which may be integrated through the Life Based VR experience, or the third parties may customize its VR systems and experiences for the users when the users use or interact with VR systems and experiences of the third parties. Depending on the actions of a third party, a license may be active, suspended, or revoked. Other license status may also be used. Security credentials including user identification (ID) and password may be assigned to an approved third party. A third party who has been approved is referred to herein as a partner. For some embodiments, only those partners whose status is active may be granted permission to access the users' life states. There may be different types of partner. For example, a partner may be an individual, an organization, a governmental agency, etc. The partners may also be defined based on the type of services they offer. For example, the type "Technical Organization" may be used for Microsoft® and Google® when they become partners, and the partner type "Medical" may be used when a doctor's office may want to use Life Based VR experiences for exams and doctor visits. The information delivered by these partners, through the user's life state, is displayed in the user's Life Based VR experiences with the embodiments described herein.

In the current example, the block 360 represents all of the partners. They include the partners 361, 362, and 363. These partners have been granted permission to the life state 390, through the security 380 and gatekeeping 385. The life state may feed into one or multiple Life Based VR experiences 301 as defined by the user and embodiments herein. As described with FIG. 3C, the level of permission of each of the partners 361, 362, and 363 may be different, as defined by the security 380 and gatekeeping 385 attributes and sub-attributes. The directions of the arrows from the partners 361, 362, and 363 to the security 380 and gatekeeping 385, and then to the life state 390 illustrate the filtering and integration of the information from the partners. For some embodiments, the partners may push information to the users, which may be integrated in the user's Life Based VR experience, and they may also offer auto-load programs that automatically populate user attributes in the life state, which may be integrated in the user's Life Based VR experience. For example, a company such as Apple Inc. may push information to a user (such as new music the user listens to), and Apple Inc. may also offer an auto-load program that populates attributes relating to entertainment, favorite content, while Amazon.com Inc. may also offer an auto-load program that populates attributes relating to asset inventory, etc. In either case, this information pushed by Amazon.com Inc. and Apple Inc. may be integrated in the user's Life Based VR experience, defined by the user and the embodiments herein.

Figure 3E:
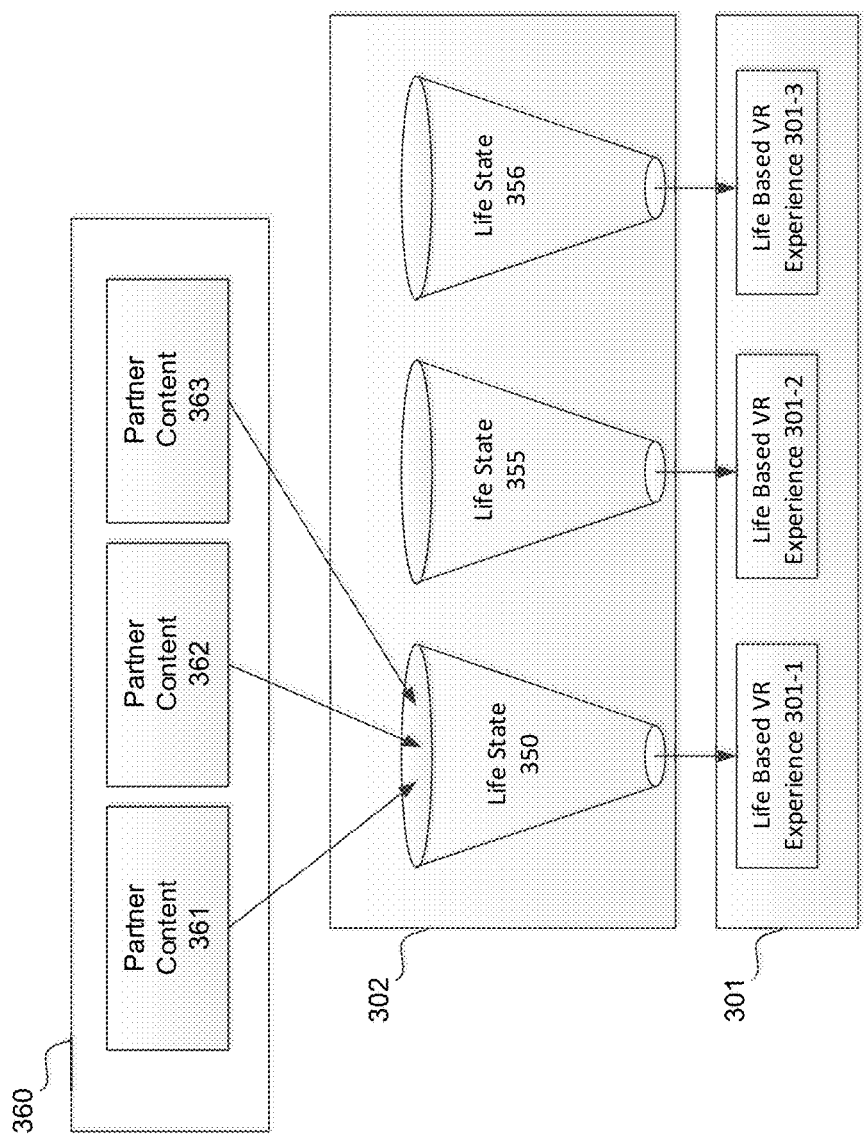
FIG. 3E illustrates an exemplary diagram of the life view, in accordance with the present disclosure.

FIG. 3E illustrates an example diagram of a Life Based VR experience, in accordance with some embodiments. The information delivery server may be configured to receive the filtered information from the partners 360 on behalf of the users and deliver that information to the user via their Life Based VR experiences 301. Each user is associated with a Life Based VR experience 301-1 to 301-3. In the current example, the Life Based VR experience 301-1 is associated with the life state 350, the Life Based VR experience 301-2 is associated with the life state 355, and the Life Based VR experience 301-3 is associated with the life state 356. To integrate the filtered information, the users may need to log in to the information delivery server using their user IDs and passwords, or provide a form of user authentication as part of their VR program. The integrated information may also be stored as floating variable, cache, memory, etc. on any device or system that integrates the filtered information. The directions of the arrows from the life states 350, 355 and 356 to the respective Life Based VR experiences 301-1, 301-2 and 301-3 illustrate the flow of the filtered information to the Life Based VR experiences. The information available via the Life Based VR experience 301-1 may be different from the information available via the Life Based VR experience 301-2 because the life state 350 may be different from the life state 355. FIG. 3E also illustrates the overall concepts of embodiments of the present invention where the collection of life states 302 is used to filter the information from the partners 360 to create the filtered information (or a subset of the information of the partner), where the filtered information is delivered to the users via the Life Based VR experiences 301. For some embodiments, the integration of the filtered information from the partners is automatic. Some embodiments may include partner's VR systems pulling the filtered information.

Figure 3F:
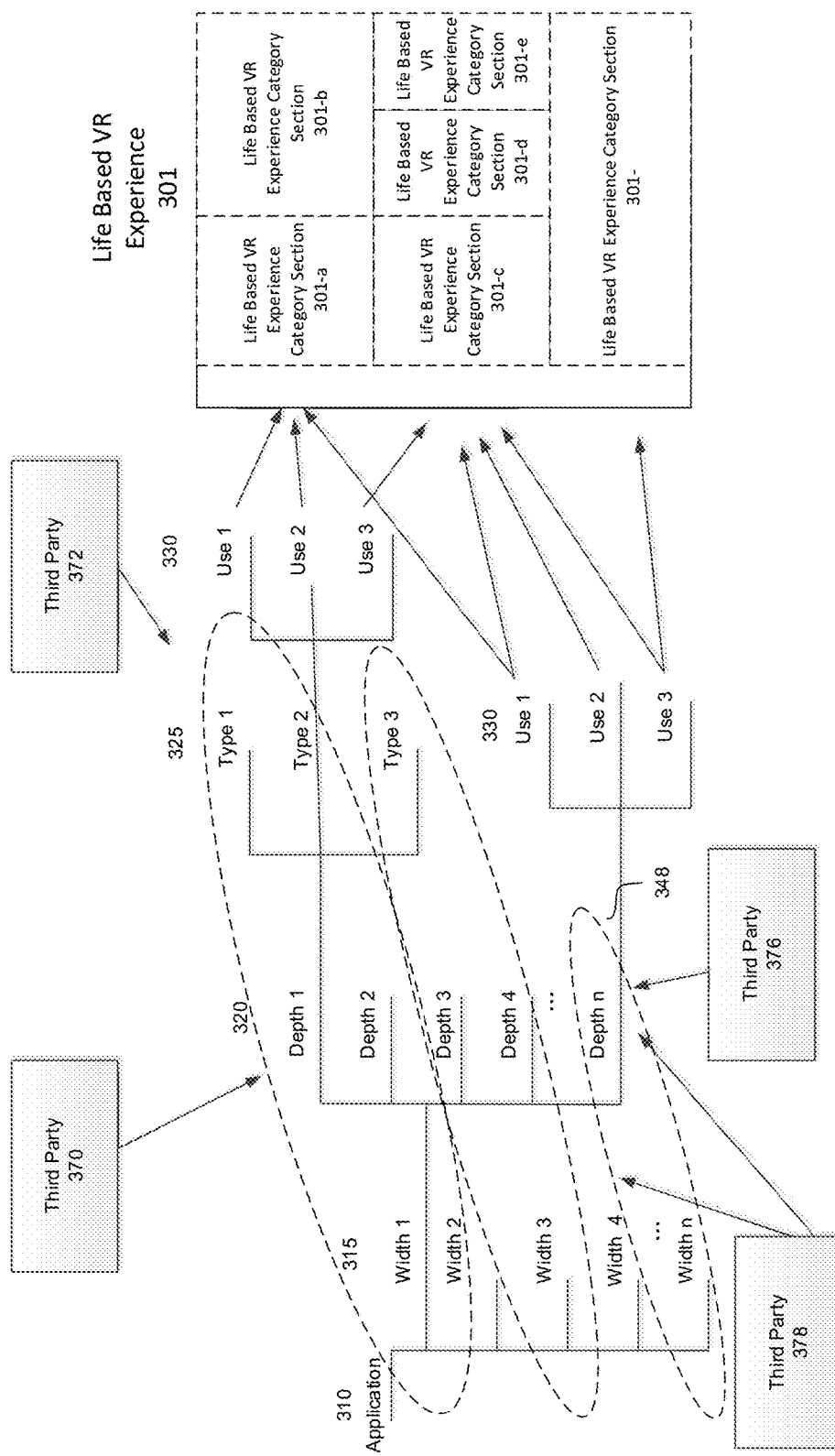
FIG. 3F illustrates an exemplary diagram of Life Based VR Experience Categories, Attributes, and the Life Based VR experience, in accordance with the present disclosure embodiments.

FIG. 3F illustrates an example diagram of a Life Based VR experience 301, in accordance with some embodiments. The Life Based VR experience 301 may comprise Life Based VR experience category section 301-a through 301-f. The information delivery server may be configured to integrate information from partners, according to any combinations of application 310, width 315, depth 320, type 325, and use 330. These combinations may be integrated with different Life Based VR experiences 301. A Life Based VR application may be a complete or part of a program, application, technology, setting, or any form or function that uses an augmented form of interaction, visibility, interact ability, or virtual experience. A Life Based VR application may have widths and depths that determine the life state categories, attributes, and sub-attributes that are integrated into the Life Based VR experience. A width may have multiple depths defined, a depth may have multiple types defined, and a type may have multiple uses defined. Uses may also be defined directly for a depth, depending on the Life Based VR experience. Many uses may be defined for an application, and each combination of application, width, depth, type, and use may relate to many different Life Based VR experiences. For example, an augmented reality application that provides additional information for a tourist in Yosemite may have application, width, and depth settings that define the Yosemite program, which accesses the user's categories, attributes, and sub-attributes that relate to demographics, travel history, physical capabilities, vacation plans, etc.; which may include types defined as site seeing, which also includes uses that define specific instructions for providing augmented visual details, sound, images, social relationships depictions, geographical positioning. For example, another application for Yosemite hiking may use similar application, width, depth, and type settings, but integrate different use settings.

Server Applications

Figure 4:
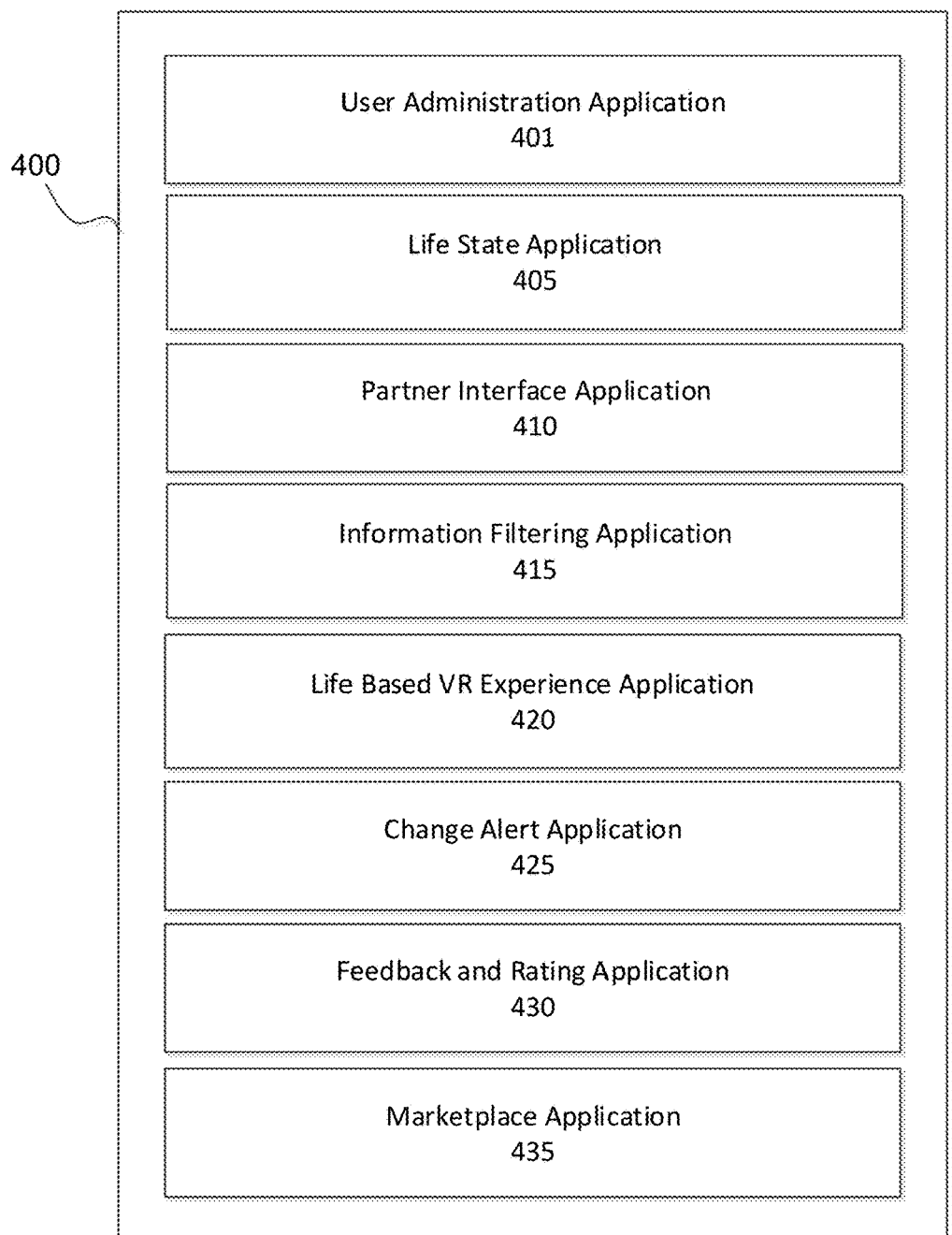
FIG. 4 illustrates exemplary applications that may be used to enable the users to receive, integrate, and manage the filtered information from the partners, in accordance with the present disclosure.

FIG. 4 illustrates example applications that may be used to enable the users to receive the filtered information from the life state and partners, in accordance with some embodiments. The information delivery server 400 may include user administration application 401, life state application 405, partner interface application 410, information filtering application 415, Life Based VR experience application 420, change alert application 425, rating application 430 and marketplace application 435. It may be noted that even though these applications are described herein as separate applications, the functionalities of two or more of them may be combined into one application. These applications may be used to pull filtered information from various resources. The resources may include the life state, VR systems, Internet websites associated with the partners, direct feeds from partner servers, or other informational sources. Non-Internet resources may also be used. For example, a user's Life Based VR experience may be replicated on VR devices, AR devices, appliances, or any means that allows the user to control how to integrate the user's life state into the Life Based VR experience, the third parties to provide information for the Life Based VR experience, and the integration of the filtered information by the third parties on behalf of the user. It may be noted that not every device or appliance used in embodiments of the invention is a filtered or integrated information mechanism. That is, some devices may be registered in the core system to integrate the information, and then the devices may only function in the ecosystem as a conduit for the Life Based VR information for the users.

The life states of all of the users may be securely stored in the database associated with the information delivery server 400 and in a relational structure with tables and fields arranged in ways that are logical and meaningful to the user. When the users update their life states, the updated values may be stored in the same database. It is possible that the updates may also be propagated to the Life Based VR experience and other replicated systems, devices, appliances that locally store the values, as well as third parties that customize their VR systems, web sites according to these values. This propagation would be similar to a change trigger.

For some embodiments, a copy of the user's Life Based VR experience settings may be downloaded and stored in the memory of the client computing system associated with the user. The copy in the client computing system is referred to as a local copy of the Life Based VR experience. It is possible that, in some embodiments, only a portion of the information or only related information may be stored in the client computing system. This is because getting the exact copy may be too big. In some embodiments the system may only store the user's ID, floating variables, memory, cache, or similar information, which is then used to pull the user's Life Based VR experience when needed.

The partner interface application 410 may be configured to enable the information delivery server 400 to communicate with one or more servers of the partners. For example, this may enable the partners to access the users' life states as defined by the users' gate keeping and security features. This may include interfacing with the partners to enable the users' Life Based VR experiences, customized interaction, filtered information, or the like.

The information filtering application 415 may be configured to share the life states of a user with the partners, limited to the level of permission granted by the user. The information filtering application 415 may also be configured to apply the Life Based VR settings, security, and the gate keeping features set by the user. As described, the partners may use the user's life state to filter their information. The information filtering application 415 may receive the filtered information from the partners, which is integrated information for the user's Life Based VR experience. As will be described, the partners may procure the life states via a marketplace, which may also include Life Based VR experiences as part of the marketplace transactions.

The Life Based VR experience application 420 may be configured to allow the users to define how the information integrates into the Life Based VR experience, according to the embodiments herein. The Life Based VR experience application 420 may be configured to provide an interface or avatar to allow the user to design the settings of the user's Life Based VR experience according to user defined settings and dynamic settings that change according to the user's life state. The interface may include parameters to control defaults, gatekeeping, security, rules, and any of the Life Based VR experience settings (application, width, depth, type, use). The user may define multiple configurations scenarios or avatars that change according to event rules defined by the user and the user's life state. For example, the user may define parameters that cause the Life Based VR experience to emphasize financial and economic information when there is a significant swing in the financial market, which is displayed as an alert or interaction in the Life Based VR experience. The interface may allow the user to define different VR settings that change according to user defined settings and the user's life state. Each of the settings may correspond to one or more aspects of the user's life. As mentioned, each of the users may be associated with a Life Based VR experience. The user accesses the Life Based VR experience by logging into the information delivery system using the assigned user ID and password. The Life Based VR experiences, their configurations, layouts, and information settings may be stored in the database associated with the information delivery server 400.

The change alert application 425 may be configured to notify the partners and the users whenever there is a change that may affect the process of providing the filtered information to the users, and how the changes may be reflected in the user's Life Based VR experience. The changes may originate from the partners and/or users. For example, the change may be necessary to address complaints or suggestions from many users and/or partners, and the changes may block or alter the information and integrations provided by that partner in the user's Life Based VR experience. The changes may originate internally by a management team associated with the information delivery system to enhance the information filtering services for the partners and/or the users, and the enhancements may be reflected in the user's Life Based VR experience. For example, it may be necessary to add a new category, to migrate an attribute from one category to another category, to delete an attribute, to change the meaning of an attribute, etc., and the changes may be reflected in the user's life view. The changes may originate internally by the user or structure of the life state or externally by others. The change alert application 425 may also be configured to notify a partner when the user modifies the user's life state, and the changes may be reflected in the user's Life Based VR experience. Similarly, the change alert application 425 may notify a user when the partner's ability to provide or integrate its information is modified.

The rating application 430 is configured to improve the quality of the filtered and integrated information. This includes providing a mechanism to allow the users to rate the partners as well as a mechanism to allow the partners to rate the users. The rating of the users may be based on actual user behaviors, within the Life Based VR experience, within a Life View, within an Information Marketplace, within a life state, or any combination thereof. The rating of the partners is based on whether the filtered and integrated information is aligned with the life states of the users. The rating may be based on a collection of feedbacks from many users. This helps the partners to fine tune their filtering and integration mechanisms if they receive low ratings. This also helps identifying the partners who consistently fail to comply with the filtering requirements and helps identify partners with high ratings, which may serve as a value to users to include the partner in their Life Based VR experience. The user's Life Based VR experience may also allow users to rate partners and delete or hide partner information from the user's Life Based VR experience, according to the partner's information quality. For example, a partner who provides unsolicited advertising information should get a low rating and the user may delete or remove the partner's information from the Life Based VR experience, because it abuses the information delivery system. A possible consequence for a partner who gets a low rating is a suspension or revocation of its license, and the user's Life Based VR experience may delete or hide the partner's information by the user's direct modification to the Life Based VR experience or by the user's designation of the low rating in the user's life state. The following are some non-limiting examples of the ratings for a partner, which may be viewed, modified, or accessed in the user's Life Based VR experience or the user's life state:

None—The information from the partner is not aligned with the user's life state.
   Low—The information from the partner is minimally aligned with the user's life state.
   Moderate—The information from the partner is mostly aligned with the user's life state.
   High—The information from the partner is significantly aligned with the user's life state.

In order for a user to receive accurate filtered and integrated information, it may be necessary for the user to keep the user's life state updated or utilize automatic loader programs that accomplish the same. This is because the user rating is based on whether the user's life state is aligned with the user's behavior whenever applicable. If a partner determines that the user's life state is not accurate, the partner may notify the user of the alignment issue, through a system of ratings. This notification may be visible in the user's life state, life state related information, or Life Based VR experiences. If the user's behavior remains non-aligned with the user's life state for an extended period of time, the information provided to the user, and in turn integrated into a Life Based VR experience, may be limited or less accurate. The following are some non-limiting examples of the ratings for a user, which may be viewed, modified, or accessed in the user's Life Based VR experience, life state related information, or the user's life state:

None—The user's transactions and interactions are not aligned with the user's life state.
   Low—The user's transactions and interactions are minimally aligned with the user's life state.
   Moderate—The user's transactions and interactions are mostly aligned with the user's life state.
   High—The user's transactions and interactions are significantly aligned with the user's life state.

The marketplace application 435 may be configured to implement an exchange or a market where the users and the partners participate in sell and buy transactions. In some embodiments, the marketplace may be implemented as a secure web portal that enables the partners to procure the users' life state according to the security, gatekeeping, and marketplace features. For some embodiments, the marketplace application 435 may be implemented as an auction portal with bidding and purchasing options. Other purchasing options (e.g., fixed price, etc.) may also be used. The auction portal may allow searchable bids and reverse bids by the partners and the users. Bid information may be stored in the secured database associated with the information delivery server. The user's marketplace transactions and activity may be displayed in the user's life view. In some embodiments, the marketplace application 435 may be implemented as an auction VR application with bidding and purchasing options, and other purchasing options (e.g. fixed price, etc.) may also be used.

Security and Gatekeeping Features

A partner may access the life states of the user according to the user's security and gatekeeping features. Referring to FIG. 3D, a user may use the security features 380 and the gatekeeping feature 385 to control how the information is filtered so that the user's life will receive the most relevant and most desirable information. The user may use the security feature 380 to control the visibility and integration at the global level, partner level, category level, attribute level or sub-attribute level. The security features set at the global level apply to all categories, attributes, and sub-attributes. The security features set at the category level apply to all corresponding attributes and sub-attributes. The security features set at the attribute level apply to all corresponding sub-attributes and so on. When there is a difference among the settings of the security features, the settings of the security features at the lower level takes precedence over the settings of the security features at the corresponding higher level. For example, if a user sets a value at the global level, and then sets another value at the category level, the value at the category level will determine the setting of the security features for the category where the value was set. Following are some non-limiting example settings of the security features:

Not available—No information relating to the category, attribute, or sub-attribute is available to any partner or any other parties to deliver information to the user's Life Based VR experience.
   Available only to preferred/approved list—No information relating to the category, attribute, or sub-attribute is available to any partner or other parties unless they are included in the user's list of approved or preferred partners and/or parties to deliver information to the user's Life Based VR experience.
   Available—Information relating to the category, attribute, or sub-attribute is available to any partner to deliver information to the user's Life Based VR experience.
   Available to content providers—No information relating to the category, attribute, or sub-attribute is available to any partner to deliver information to the user's Life Based VR experience, unless the partner is a content provider or the partner is in the list of approved or preferred content providers.
   Available to advertisers—No information relating to the category, attribute, or sub-attribute is available to any partner to deliver information to the user's Life Based VR experience unless the partner or other party is an advertiser or is in the user's list of approved or preferred advertisers.

The gatekeeping feature 385 illustrates an option that a user may use to control how much information the user is willing to receive and integrate from which partners into the user's Life Based VR experience. The user may use the gatekeeping feature 385 to control how an attribute can be used to filter and integrate information from a partner and the volume of the information delivered to the user's Life Based VR experience. The gatekeeping features set at the global level apply to all categories, attributes, and sub-attributes. The gatekeeping features set at the category level apply to all corresponding attributes and sub-attributes. The gatekeeping features set at the attribute level apply to all corresponding sub-attributes and so on. When there is a difference among the settings of the gatekeeping features, the gatekeeping features set at the lower level takes precedence over the gatekeeping features set at the corresponding higher level. For example, if a user sets a gatekeeping value at the global level, and then set another conflicting gatekeeping value at the category level, the gatekeeping value at the category level will prevail. Some examples of the gatekeeping features settings include:

No gatekeeping—All of the information is passed to the user's life state and then to the user's Life Based VR experience through the funnel.
   Approved list—The information is passed to the user's life state and then to the user's Life Based VR experience if the information is from a partner that is in the list of the user's approved or preferred partner.

Content providers—The information is passed to the user's life state and then to the user's Life Based VR experience if the information is from a partner who is a content provider or if the partner is in the user's list of approved or preferred content providers.

Advertisers—The information is passed to the user's life state and then to the user's Life Based VR experience if the information is from an advertiser or if the information is from a partner who is in the user's list of approved or preferred advertisers.

None—No information is passed to the user's life state and then to the user's Life Based VR experience.

In some embodiments, a user's security settings may allow life state information to be provided to partners, but the user's gatekeeping settings may not allow the partner's information to be pushed and/or integrated to the user's Life Based VR experience, which may be the case when a partner requires information across multiple categories to provide information and integrations only allowed in a single category, attribute, and sub-attribute combination.

For some embodiments, there may also be many other gatekeeping controls, such as frequency and precedence controls that will affect how the system queues up information from partners for the user's Life Based VR experience, which will be a key control in promoting partners to only push the information and integrations that really counts, while the user receives only the information that really counts.

In general, gatekeeping features are different from security in that they determine how information is delivered, displayed, and integrated into the user's Life Based VR experience. This includes controlling the frequency, extent, type, and volume of filtered and integrated information that is provided by the partner. For some embodiments, when a user wants to allow information for a specific attribute to be sold in a marketplace, but no information is delivered or integrated for that attribute in the user's Life Based VR experience, then the security settings would allow visibility in the marketplace, and the gatekeeping settings would not allow information delivery and integration into the Life Based VR experience.

Automatic Populating and Updating Attribute Values

For some embodiments, the life state application 405 described with FIG. 4 may be configured to auto-populate the attributes and sub-attributes with values. The values may be derived from the partners. It is possible that the partners may accumulate extensive information about a user's behavior, which in turn gives them the ability to populate the users attribute values according to this behavior. For example, a set of attributes for a user's asset inventory may include various products, etc. Amazon.com Inc. could easily populate the asset inventory according to the user's purchase history. A user's behavior may also be accumulated by the user's Life Based VR experience, by tracking which behaviors or other interactions a user makes within their Life Based VR experience. There may be an option to allow the user to select the auto-populating feature.

For some embodiments, the life state application 405 described with FIG. 4 may be configured to automatically update the life state of a user. There may be a setting that enables the user to indicate that the automatic update of the user's life state is allowed. The updates may be based on transactions that the user engages in or behavior the user engages in while using their Life Based VR experience, and may be performed periodically. It is possible that user's behavior may not be consistent with the user's life state. For example, the user indicates in the life state category and attribute values that would lead to not integrating country music into the Life Based VR experience. However, through the user's Life Based VR experience, the user frequently interacts with country music related activities, and also listens to country music. In this scenario, the life state application 405 may modify the user's life state to align with the user's behavior. This may include automatically translating a user's Life Based VR experience behavior and interaction into values for the attributes and/or sub-attributes. The user can also review, assess, and override any values that are set from an auto update, if the manual setting of the values better reflects the user's life state. This ensures that the user's life state is up to date, as realized through the user's behavior in the Life Based VR experience.

For some embodiments, the functionality of auto-updating and auto-loading can initially set to baseline values, but it can also update attribute values at the users' discretion. By way of non-limiting example, such baseline values may include either quantitative values, such as 1 to 10 or 0% to 100%, or qualitative values, such as small-medium-large or strongly disagree-somewhat disagree-indifferent-somewhat agree-strongly agree, or the like. There might be options or parameters on the auto-update program such as "Do not update values that have been manually updated." This would mean only null values or those previously set by the auto-update program would be updated.

Network with Partner Servers

Figure 5:
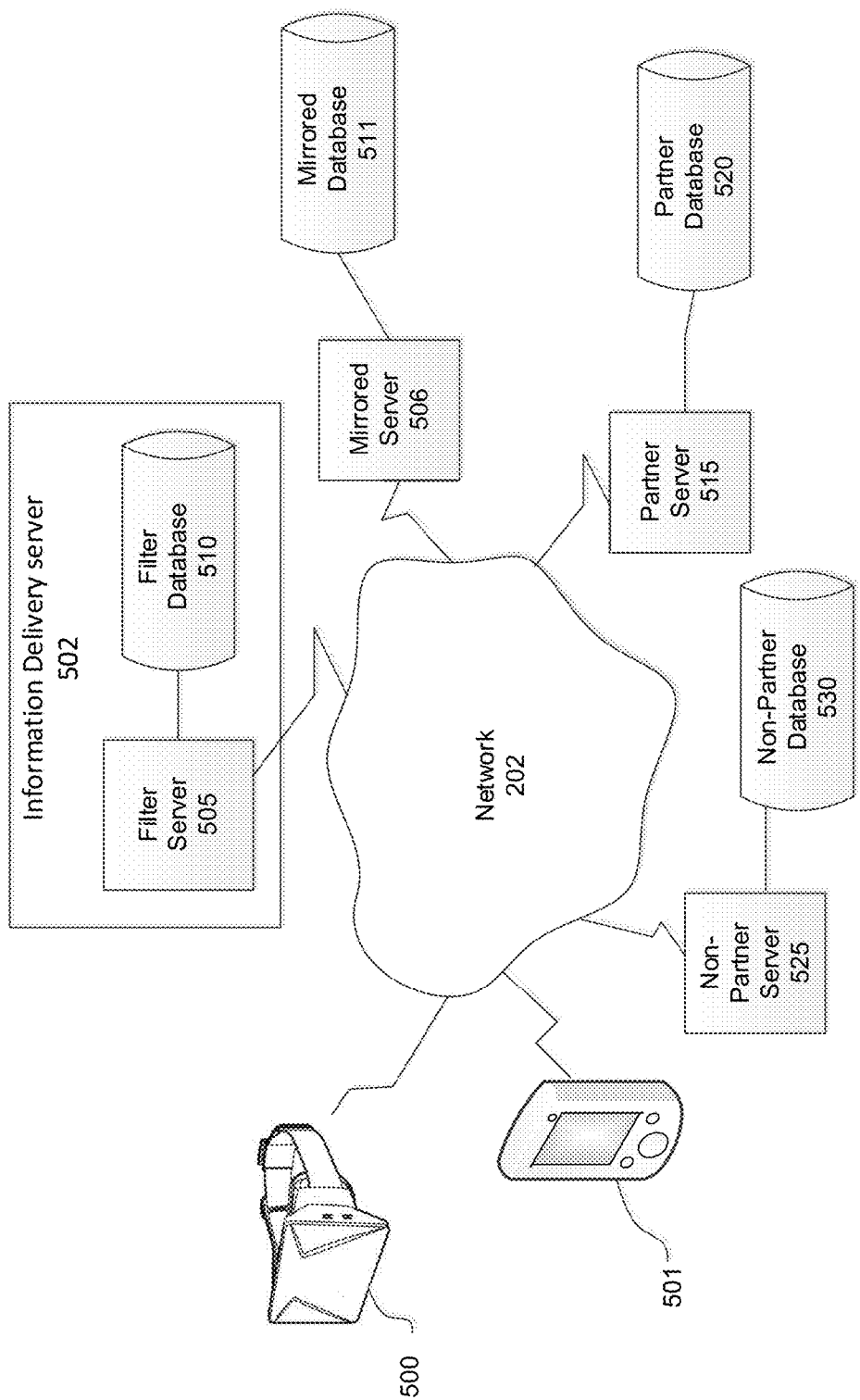
FIG. 5 illustrates an exemplary network with an information delivery server, in accordance with the present disclosure.

FIG. 5 illustrates an example of a network with an information delivery server, in accordance with some embodiments. The network may include an information delivery server 502 comprising a server 505 coupled with database 510 and connected to network 202. Also connected to the network 202 are client computing systems 500 and 501, partner servers 515 and non-partner server 525 and their respective databases 520 and 530. By way of non-limiting examples, and as described above, the client computing systems 500, 501 may include any VR system, AR system, holographic imaging device, laptop computer, gaming system, cell phone, 'smart' phone, personal digital assistant, or the like, and be configured with software to access the services of the information delivery server 502 using the Internet. The client computing systems 500, 501 may be connected to the network 202 via wired or wireless communication (e.g., RF, Bluetooth, etc.). For example, a user may use the client computing system 500 to register with the information delivery server 502, input values to configure the user's life state, and set up security features and gatekeeping features, which in turn manage information integrated into the user's Life Based VR experience. The user may use the client computing system 500 to log in to the information delivery server 502 and access the user's Life Based VR experience to view, update, and manage the life state information. The user's life state, Life Based VR experience, security features, gatekeeping features, and filtered information may be stored in the database 510. The network infrastructure described in FIG. 5 may also be used to enable accessing partner information, partner content, performing web searches or application program interfaces from within the Life Based VR experience using partner search engines, interfaces, and enabling the partners to directly interact with user behaviors, games, learning, transactions, and other activities during the user's Life Based VR experience. Other embodiments include a partner's participation in the user's Life Based VR experience during interactions and transactions in an information marketplace, where the partner may procure the user's life state information.

Embodiments of the invention may also include mobile-enabled implementations to enable the users to use the mobile devices to communicate with the information delivery server. As illustrated in FIG. 5, the client computing system 500 may by way of a non-limiting example, include a smart phone coupled with a VR viewer and be used by a user to connect to the information delivery server 502 via the network 202. Having the mobile capability may enable the users to provide updates on an impulse basis, especially at a time when the user is experiencing something that may need to be reflected in the user's life state. The information delivery server 502 may enable the user to download a mobile application for this purpose. The mobile application may include user interface that makes it easier to provide information about the user's experience. The mobile application may include auto-load programs or API's to automatically capture some or all of the user's life state and communicate the information to the information delivery server 502. The mobile application may also allow a user may further modify the information of the life state. For example, the user may be watching a movie, and the user may use the mobile device to indicate the name of the movie and how much the user enjoys watching that movie. That action will be analyzed by the information delivery server and the user's entertainment attribute may be updated. These embodiments may be immediately available and reflected in the user's Life Based VR experience.

In some embodiments, the user travels to places in the real world while also carrying a mobile virtual reality device that includes a global positioning system chip (GPS chip) to track the user's movements. The client computing system 500 synchronizes the GPS data describing the user's travels to the information delivery server 502 via the network 202. The information delivery server 502 then updates the user's Life Based VR with the locations visited by the user. Other methods besides GPS may be used to obtain location data, for example, Wi-Fi signals. In some embodiments, the user tags locations they have visited in a social network. The information delivery server 502 then updates the user's Life Based VR with the locations tagged by the user.

Mirroring and Distributed Processing

Referring to FIG. 5, in some embodiments, there may be one or more mirrored servers 506 configured to perform tasks similar to the information delivery servers 502 to accommodate the demand and usage by many users. These mirrored servers may be located at different geographical areas. For example, at a first site, there may be one or more mirrored servers 506. Each of the mirrored servers 506 may be associated with a mirrored database 511 which may be configured to store information similar to the database 510. Further, there may be multiple mirrored sites, each having similar hardware and software configuration and set up as the first site. The multiple sites may collaborate with one another in a distributed manner to help speed up the process enabling the users to set up and maintain their life states, interacting with the partner servers, receiving the filtered and integrated information from the partners, enabling the users to configure their Life Based VR experiences, integrating the information to the users' Life Based VR experiences, etc. Using mirrored servers and distributed processing may help the users to view most relevant and accurate information in their Life Based VR experiences in near real time. It should be noted that there are many different distributed processing architectures and the description provided here is not meant to limit to a particular architecture, but rather to convey that distributed processing may be implemented to provide better user experience for some embodiments.

Flow Diagrams

FIGS. 6-11 describe various processes that may be performed by the information delivery system and Life Based VR experience. Each process includes multiple blocks, with each block representing one or more operations. The sequences of the blocks may vary depending on the implementations. Some operations may be combined while some operations may be separated into multiple operations.

Figure 6:
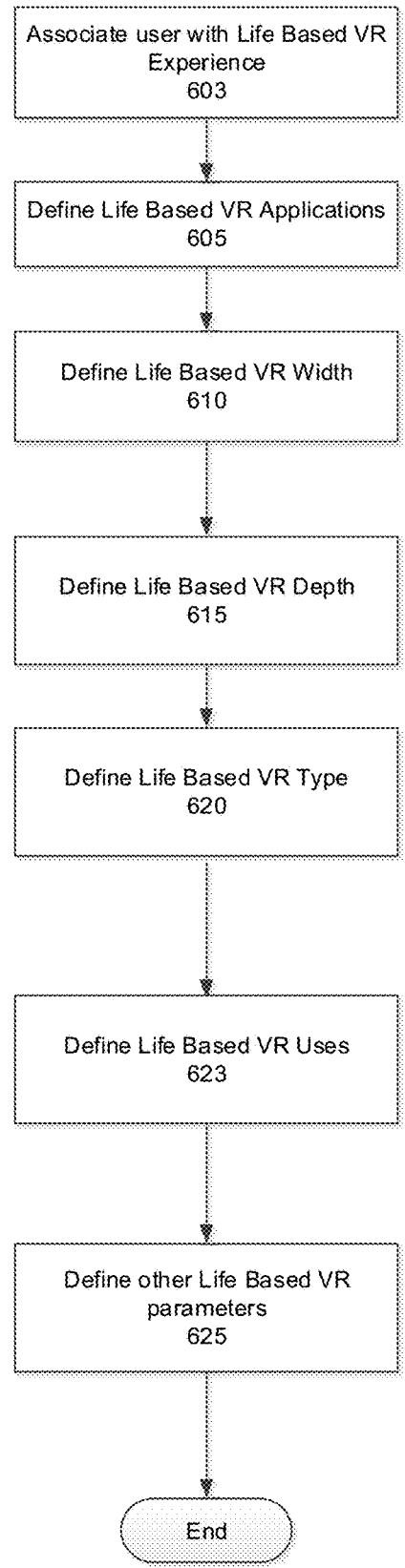
FIG. 6 illustrates an exemplary flow diagram of a process that may be performed by an information delivery system Life Based VR experience to integrate the life states, in accordance with the present disclosure.

FIG. 6 illustrates an example flow diagram of a process that may be performed by an information delivery system to set up the Life Based VR experience, in accordance with some embodiments. The process is associated with operations that may be performed by the information delivery server 502 described with FIG. 5. Beginning at block 603, the association of a Life Based VR experience with a user is defined. At block 605 and through block 625, the application that the Life Based VR experience applies to is defined, with related settings. At block 610, the beginning of the structure of a Life Based VR experience is defined. This may include widths and depths, defining parameters for the categories, the attributes, the sub-attributes, the lower level sub-attributes, the types, the uses, and other Life Based VR parameters. For example, each of the user and Life Based VR associations, applications, widths, depths, attributes, sub-attributes, types, uses, and other parameters may be represented by fields in a database table with each of the fields having a value or as programming variables in RAM or cache, or as other embodiments. Each time a new user is registered with the information delivery server 502, a Life Based VR experience may be associated with that user, as shown in block 603. The applications, widths, depths, attributes, sub-attributes, types, uses, and other parameters associated with the user's Life Based VR experience may be automatically given some values. These values may be derived from default settings for a given application, as shown in blocks 610 through 625. These values may also be derived from changes in the user's life state. For example, a user's Life State may include data that certain types of video feedback may cause the user to experience seizures, and a Life Based VR experience may use this information to set attribute and sub-attribute defaults relating to video, screen, field of view, and other values that can be used to reduce the risk of user seizure. At blocks 610 through 625, the user is also allowed to change settings and update values that determine how and if the configuration will cause integration of life state attributes and/or sub-attributes. Whether defaults or more detailed manual user updates are used may be due to changes to the user's life and how the user's Life Based VR experience, and user's life state is defined. At block 625, additional parameters may be made available to enable the users to set security features and gatekeeping features, and other VR specifications and information parameters to customize the user's Life Based VR experience. As described, these features allow the users to configure the integration and functionality of the user's Life Based VR experience and how or from whom the information is to be integrated into the experience on behalf of the user.

Figure 7:
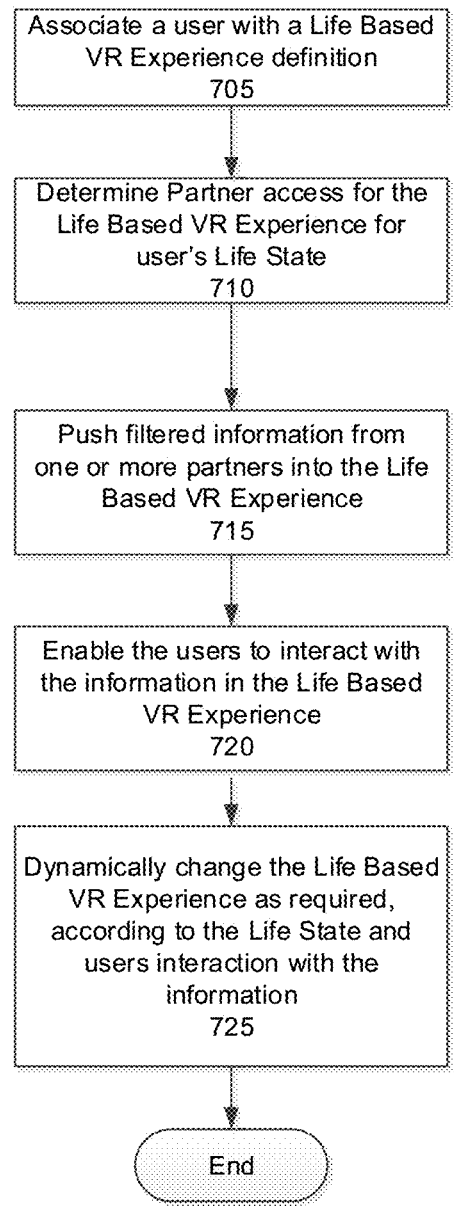
FIG. 7 illustrates an exemplary flow diagram of a process that may be performed by an information delivery system Life Based VR experience to allow the users to integrate the filtered information, in accordance with the present disclosure.

FIG. 7 illustrates an example flow diagram of a process that may be performed by an information delivery system to allow the users to view the integrated information from partners, in accordance with some embodiments. The process is associated with operations that may be performed by the information delivery server 502 described with FIG. 5. When a user registers with the information delivery system and creates a user account, that user account is associated with a user's Life Based VR experience, as shown in block 705. The user may be provided options to configure the user's Life Based VR experience. This may include configuring the Partner's integration into the user's Life Based VR experience. At block 710, one or more partners may access the user's Life Based VR experience. The access of the user's life state and Life Based VR experience is based on permissions granted by the users. The partners may use the user's life state to generate filtered information that is aligned with the user's life state. At block 715, the filtered information, which may also include settings and logic concerning the information, are pushed by the partners. For example, one of the settings a user may specify is to allow a Partner to define the width, depth, use, and type settings for a given Application, where the Partner will provide the information and settings that determine how the information will be used. At block 720, the filtered information is integrated into the user's Life Based VR experience, according to the user's life state in FIGS. 3A-3F and Life Based VR settings in FIG. 6. At block 725 the user's Life Based VR experience dynamically changes based on the user's interaction with the life state, the life state information, and the Life Based VR experiences.

Figure 8:
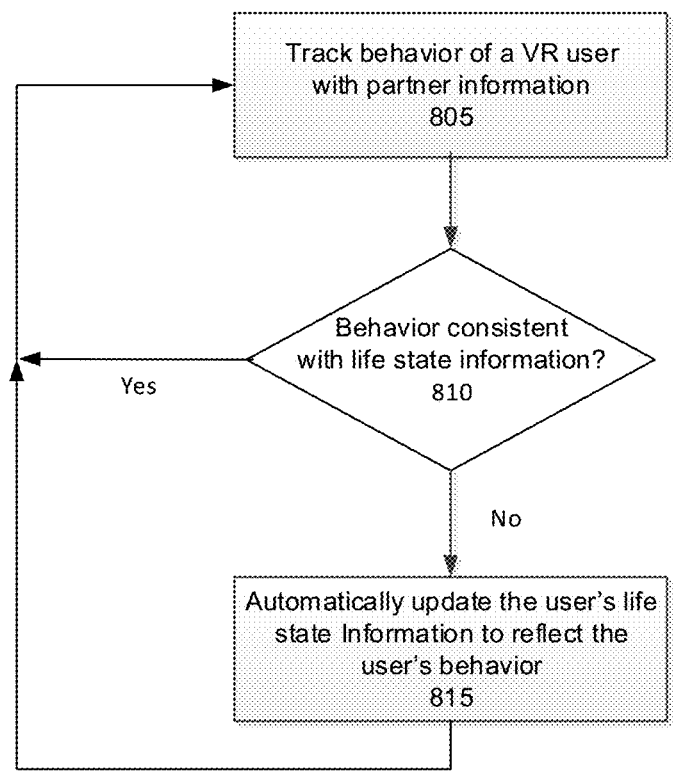
FIG. 8 illustrates an exemplary flow diagram of a process used to rate a user and update the user's life state through the Life Based VR experience, in accordance with the present disclosure.

FIG. 8 illustrates an example flow diagram of a process that may be performed on an information delivery server to enable automatically updating the user's life state, in accordance with some embodiments. The process is associated with operations that may be performed by the information delivery server 502 described with FIG. 5. The process may include tracking the user's behavior when the user interacts with partner information in the user's Life Based VR experience. As described above, when the user interacts with partner information in the user's Life Based VR experience, the partner may recognize that the user is a member of the same information delivery system that the partner is associated with. The partner may customize the information integrated with the Life Based VR experience, using this information, or customize the user's Life Based VR experience, according to the embodiments herein. The account of the user and the account of the partner with the information delivery system may be related or connected. The recognition may be based on the information stored locally on the client computing system of the user. Alternatively, the user ID may be locally stored or stored in temporary internet/buffer files by associating with another user login, and then the attribute values from the user's life state may be obtained, refreshed, or updated according to the user's behavior.

The tracking operation may include interacting with the partner's server and receiving the tracking information from the partner's server, as shown in block 805. At block 810, a test is performed to determine if the user's behavior is aligned with the user's life state. If the user's behavior is aligned, the process flow from block 810 back to block 805 and the determination may continue. However, from the block 810, if the user's behavior is not aligned, the process flow to block 815, where the user's life state may be automatically updated to reflect the user's behavior. From the block 815, the process may flow back to block 805 and the determination may continue. For some embodiments, this process may be performed periodically. An automatic update option may be selected by the user. In this process, the users will also be provided with the attribute values that are not aligned, which may help the user and partner migrate towards better alignment. The user's Life Based VR experience settings, attributes, and sub-attributes will be updated according to these changes.

Figure 9:
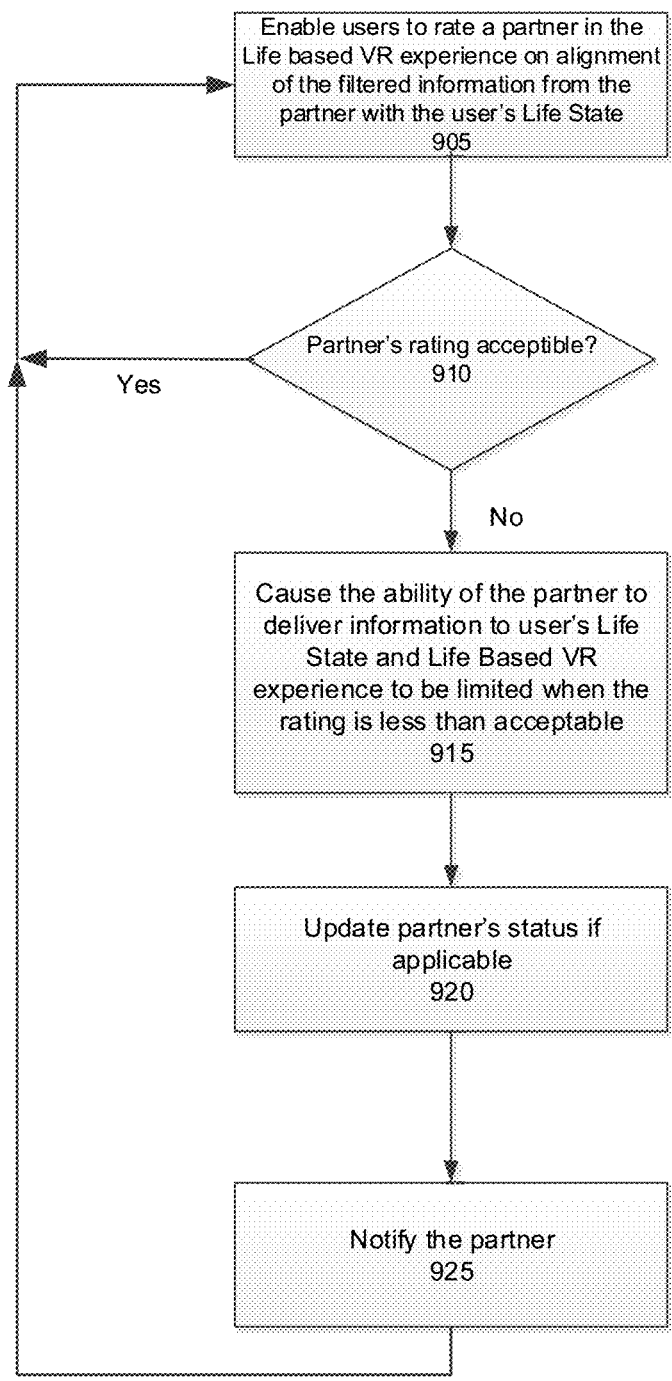
FIG. 9 illustrates an exemplary flow diagram of a process used to rate a partner through the Life Based VR experience, in accordance with the present disclosure.

FIG. 9 illustrates an example flow diagram of a process used to rate a partner, in accordance with some embodiments. At block 905, the users are enabled to provide rating information for a partner. The rating is based on how the integrated information from the partners is aligned with the users' life states. If the alignment is not as expected, the rating may be low. A rating scale may be set by the management team associated with the information delivery system. At block 910, a test is performed to determine if the rating is acceptable. If the rating is acceptable, the process may flow back to block 905 to collect more ratings. It may be noted that the rating of the partner may be evaluated after collecting a large collection of ratings from many users. From the block 910, if it is determined that the rating is not acceptable, the process may flow to block 915 where the information and integrations from the partner may be limited. For example, the information pushed by the partner may include unsolicited and/or unwanted advertising information, and the information delivery system may partially or completely block the information from the partner. For some embodiments, if the partner's rating is low, then the user may or may not want to limit the information integrations from that partner. In other words, a low alignment rating for the partner may not necessarily mean the user shows less interest in the information integrated by the partner. If the user wants to further limit, reduce, or prohibit information or information integration from a given partner, the user can use the security and gatekeeping settings to do so. At block 920, the information delivery system may change the status of the partner if necessary. For example, the partner may be suspended and its status may be changed from "active" to "suspended." This type of disciplinary action may be performed in aggregate. It may be performed by an administrator or someone with such authority, although this may also be an automated function. Partner ratings and the user's management of a partner's information delivery may also be accessible and reflected in the user's Life Based VR experience.

At block 925, the partner may be notified about the rating and related changes. For example, warnings may be sent to the partner to notify the partner about the change in status. The partner may fine tune its filtering and integration mechanisms to improve alignment. The process may flow from the block 925 to the block 905. The partner rating operations may be performed periodically or as needed.

Figure 10:
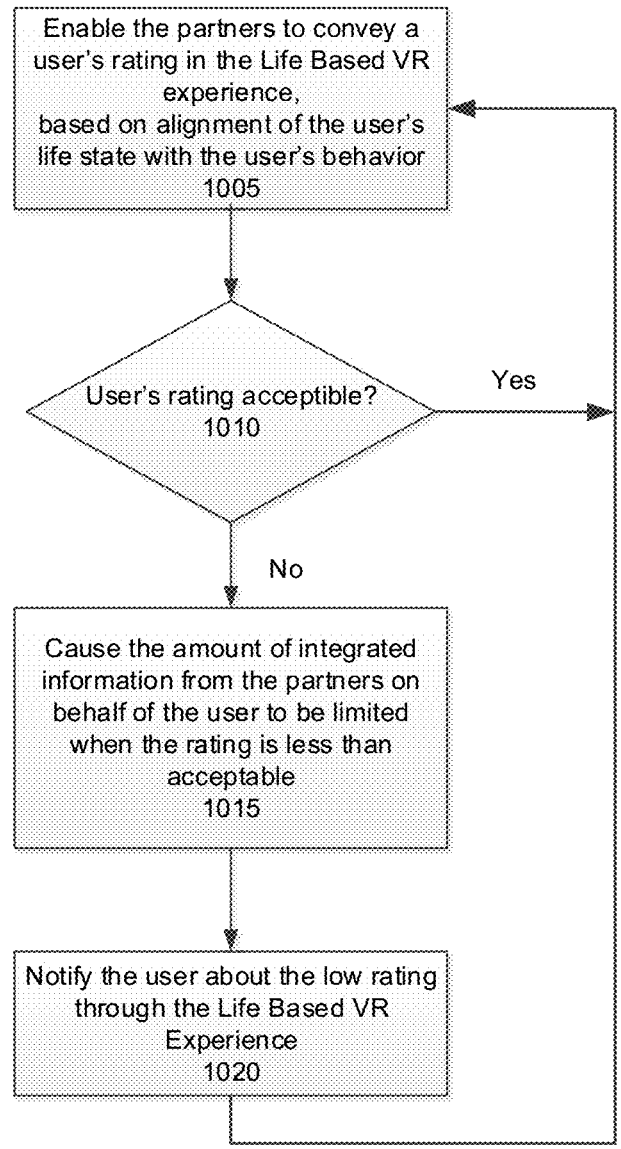
FIG. 10 illustrates an exemplary flow diagram of a process used to rate a user and convey the rating through the user's Life Based VR experience, in accordance with the present disclosure.

FIG. 10 illustrates an example flow diagram of a process used to rate a user, in accordance with some embodiments. At block 1005, the partners are enabled to provide rating information for a user. As described above, a user's life state involves many aspects of the user's life, and it is expected to change as the user experiences changes in the user's life. The changes may be reflected in the user's behavior when, for example, a partner provides a Life Based VR experience or the partner provides integrated information for the Life Based VR experience, the user may interact with the partner in other ways that allow the partner to associate the user with the user's ID. The partner may track the user's behaviors, compare those behaviors with the user's life state, and give the user a rating. At block 1010, a test is performed to determine if the rating for the user is acceptable. As with the rating for a partner, a rating scale may be determined by the management team, and the scale may be the same or different from the scale used to rate the partner. If the rating is not acceptable, the process may flow to block 1015, where the information delivery system or the partners may restrict the amount of filtered information that is pushed to the user. Other operations may also be performed when the rating is not acceptable, and the user's low rating may also be available or used in a life view or information marketplace, which may lower the utilization or value of the user's information. For example, warnings may be sent to the user to notify the user of the low rating; requests may be sent to the user to notify the user to update the user's life state; the status of the user may be changed, and the user notified, as shown in block 1020. From the block 1010, if the rating is acceptable, the process may flow back to block 1005 to collect more ratings. It is possible that the rating of the user may be evaluated after collecting a large collection of ratings from many partners. From the block 1020, the process may also flow back to the block 1005. The user rating operations may be performed periodically or as needed. Embodiments of the invention may merely notify the users of the low rating but may not cause any impact on the amount of filtered or integrated information being provided to the user. As such the operations described in block 1015 may not be performed. In these situations, the user may use the user ratings confidentially to manually work on improving the user's life state or may be just understanding it better. User ratings and the partner's management of a user's life state may also be accessible and reflected in the user's Life Based VR experience.

Figure 11:
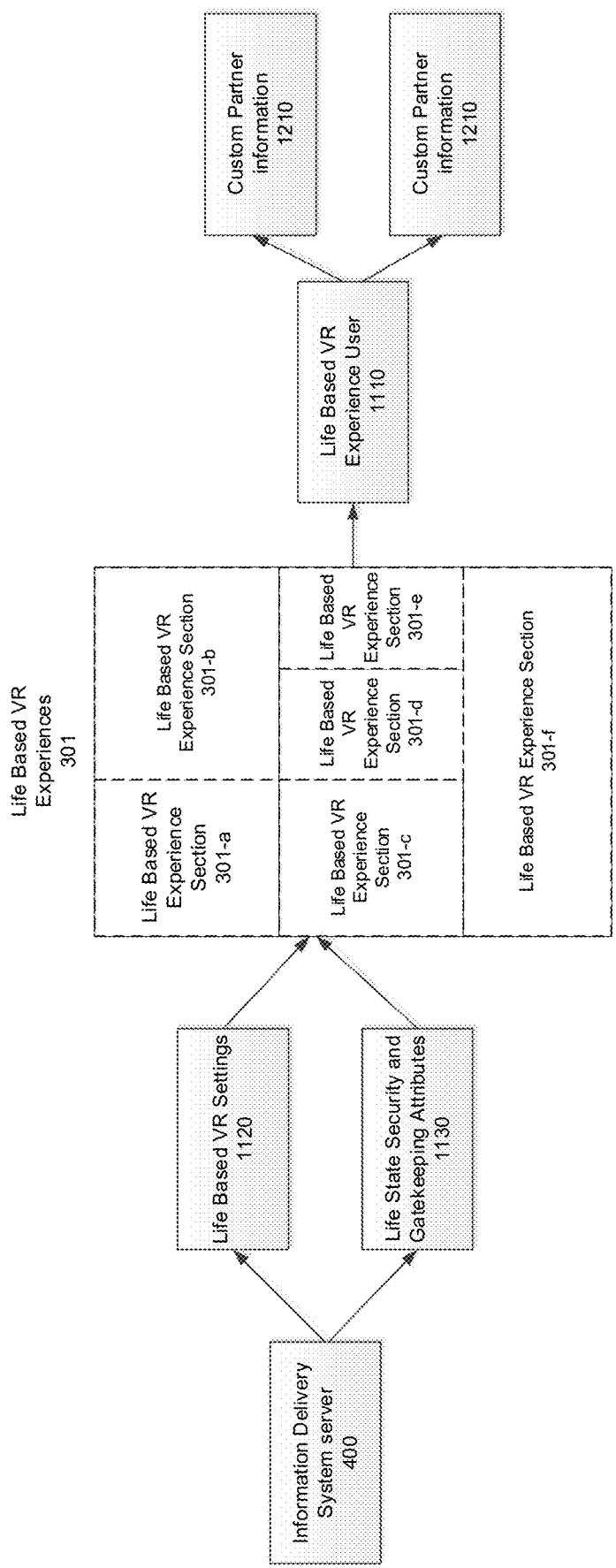
FIG. 11 illustrates an exemplary flow diagram of a process used to enable accessing the user's Life Based VR experience, in accordance with some embodiments.

FIG. 11 illustrates an example flow diagram of a process that may be used to enable accessing the user's Life Based VR experience, in accordance with some embodiments. It may be noted that the operations described in the different blocks of this process may not necessarily need to be performed in sequence and some may be performed by different partners. The blocks are meant to convey different ways that the user's Life Based VR experience may be used in various situations.

At block 301, the user may use a partner's information in their Life Based VR experience to allow the partner to customize the user's interactions with its VR experiences, devices, websites, web pages, or other means of displaying information or interacting with the partner. This may be useful when the user interacts with the partner's VR experiences, transacts with the partner, or interacts with the partner on social/professional networking sites, or through other forms of interactions. Information not consistent with the user's life state or Life Based VR experiences may be filtered from the Life Based VR experiences, websites, etc., and only relevant information may be integrated. At blocks 301-*a* to 301-*f*, the various sections of the Life Based VR experiences are available for the user, according to the Life Based VR settings, security and gatekeeping attributes, and other life state settings. The partner may associate the user ID of the user with the user's Life Based VR experience or life state from the information delivery system, retrieve (or refresh or update) the user's Life Based VR experience, and customize its VR applications, web pages, devices, or other embodiments accordingly. The partner may provide a toggle to enable the user to activate or deactivate the integration of the partner's information based on the user's life state or Life Based VR experiences. At block 1120, the user may use the Life Based VR settings to determine how the various sections of the user's Life Based VR experiences may provide life based customized experiences for the user. At block 1130, the user may use the life state security and gatekeeping attributes to determine how the various partner information and life state integrations from the user's life state may be prioritized, used, and integrated for the user. At block 1110, the Life Based VR experience user uses the life state information to in turn interact with the Life Based VR experience and partners, yielding customized partner information and user activity at block 1210.

From the descriptions above, embodiments of the inventions may include a method for receiving information about and relevant to a user's life from a user who is a registered member of an information delivery system. The information about and relevant to the user's life includes at least (a) demographic information, (b) health information, (c) ethnic information, (d) social information, and (e) psychological information. The method also includes enabling the user to grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, method, and volume of filtered information that is pushed by the partner and integrated into the user's Life Based VR experiences. In addition, the method includes receiving the filtered information from the partner, wherein the filtered information is generated by the partner based on applying the information about and relevant to the user's life to information of the partner, wherein the information about and relevant to the user's life is provided by the user using a client computing system or VR system, as described herein, associated with the information delivery system, and wherein the information about and relevant to the user's life is received by a server computing system associated with the information delivery system. Embodiments of the invention also include a computer-readable media that includes instructions that perform the operations similar to the method described above.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

While the invention has been described in terms of particular variations and illustrative figures, those of ordinary skill in the art will recognize that the invention is not limited to the variations or figures described. The features described with respect to one embodiment or variation may be used in other embodiments or variations. Methods described separately may be combined. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims. Finally, all publications and patent applications cited in this specification are herein incorporated by reference in their entirety as if each individual publication or patent application were specifically and individually put forth herein.

What is claimed is:

1. A computer-implemented method, comprising:
   receiving information about and relevant to a user's life from a user, the user being a registered member of an information delivery system, wherein the information about and relevant to the user's life includes at least one of (a) demographic information, (b) health information, (c) ethnic information, (d) social information, and (e) psychological information;
   establishing a data structure to enable the user to provide the information about and relevant to the user's life, the data structure including fields related to one another, wherein each of the fields is associated with a value, wherein the data structure includes multiple levels such that a field at a lower level is to provide more detailed information and value than a corresponding field at a higher level;
   providing the user with input options by which the user can grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner, in order for the partner to integrate customized information relevant to the user's life;
   providing, interacting, and integrating information to and from a life view to enable users and partners to interact with information about the user's life, wherein the user may view and interact with, prioritize, position, integrate, and display information regarding the user's life as part of a Life Based VR experience;
   automatically populating the fields of the data structure with a set of baseline values;
   providing the user with input options by which the user can update the baseline values and non-baseline values to accurately reflect the user's life, wherein baseline information may be specified, displayed, prioritized, positioned, and integrated in the Life Based VR experience from multiple levels according to the user's life;
   receiving the filtered information from the partner, wherein the filtered information is generated by the partner based on applying the information about and relevant to the user's life to information of the partner, wherein the information about and relevant to the user's life is provided by the user using a client computing system associated with the information delivery system, wherein the information about and relevant to the user's life is received by a server computing system associated with the information delivery system, and wherein the information about the user's life is received and processed at the point the user realizes changes in their life state.

2. The computer-implemented method of claim 1, further comprising:
   providing the user with input options by which the user can update the baseline values and the non-baseline values using a mobile computing system and a mobile application associated with the information delivery system, wherein information may be specified, displayed, prioritized, positioned, and integrated in the Life Based VR experience using a computing system modified by a mobile application.

3. A computer-implemented method, comprising:
   receiving information about and relevant to a user's life from a user, the user being a registered member of an information delivery system, wherein the information about and relevant to the user's life includes at least one of (a) demographic information, (b) health information, (c) ethnic information, (d) social information, and € psychological information;
   providing the user with input options by which the user can grant permissions to a partner to access the information about and relevant to the user's life, wherein the partner is also a registered member of the information delivery system, and wherein the user grants the permission to the partner by controlling visibility of the partner to the information about and relevant to the user's life and by controlling frequency, extent, type, and volume of filtered information that is pushed by the partner, in order for the partner to integrate customized information relevant to the user's life; and
   receiving the filtered information from the partner, wherein the filtered information is generated by the partner based on applying the information about and relevant to the user's life to information of the partner, wherein the information about and relevant to the user's life is provided by the user using a client computing system associated with the information delivery system, wherein the information about and relevant to the user's life is received by a server computing system associated with the information delivery system, and wherein the information about the user's life is received and processed at the point the user realizes changes in their life state;
   providing the user with input options by which the user can rate the partner based on whether the filtered information from the partner is aligned with the information about and relevant to the user's life; and
   providing the partner with input options by which the partner can rate the user based on whether the information about and relevant to the user's life is aligned with behavior of the user when the user interacts with a Life Based VR experience, website, or device associated with the partner, wherein the user rating for the partner may be used as a setting in the user's specification, prioritization, positioning, displaying, and integration of that partner's information in the Life Based VR experience, and wherein the partner rating for the user may be visible in the user's specifications, prioritization, positioning, displaying, and integration of that partner's information in the Life Based VR experience.

4. The computer-implemented method of claim 3, further comprising:

storing the information about and relevant to the user's life and Life Based VR experience in a secured relational database associated with the information delivery system; and making the information about and relevant to the user's life accessible by the partner when the user interacts with a Life Based VR experience or a website of the partner, and making the information about and relevant to the user's life customizable and accessible by the user through the user's Life Based VR experience.

5. The computer-implemented method of claim 4, wherein customized VR experiences, websites, or devices are presented to the user when the user interacts with the Life Based VR experience, websites, or devices, wherein the customized VR experiences, websites, or devices are generated by the partner based on the information about and relevant to the user's life, and wherein the user may access these customized VR experiences, websites, or devices from a Life Based VR experience.

6. The computer-implemented method of claim 4, wherein filtered information is presented to and integrated into the users Life Based VR experience when the user interacts with a VR system of the partner, wherein the information is generated by the partner based on parameters provided by the user and based on the information about and relevant to the user's life, and wherein the parameters used by the partner may be factored into the information pushed by the partner into the Life Based VR experience.

7. A non-transitory computer-readable media that stores instructions, which when executed by a machine, cause the machine to perform operations comprising:

receiving information about a user's life from a user who is a registered member of an information delivery system, wherein the information about the user's life includes at least demographic, health, ethnic, social and psychological information;

providing the user with input options by which the user can set parameters to control (a) access to the information about the user's life by a partner and (b) volume and frequency of filtered information to be received from the partner on behalf of the user, wherein the partner is also a registered member of the information delivery system;

receiving the filtered information from the partner, wherein the filtered information is generated by applying the parameters to information of the partner;

integrating the filtered information into a user Life Based VR experience;

establishing a data structure to enable the user to provide the information about the user's life, the data structure including fields related to one another, wherein each of the fields is associated with a value representing one aspect of the user's life;

automatically populating the fields of the data structure with a set of baseline values;

providing the user with input options by which the user can manually update the values to more accurately reflect the user's life;

providing the user with input options by which the user can rate the partner based on whether the filtered information pushed and integrated by the partner is aligned with the information about the user's life; and providing the partner with input options by which the partner can rate the user based on whether the information about the user's life is aligned with behavior of the user when the user interacts with the Life Based VR experience, or visits a website associated with the partner; and presenting the baseline values or updated values, and the partner and the user ratings, in a user Life Based VR experience, or a website, according to the user's defining of applications, extent of attributes, depth of attribute detail, type, usage, and custom VR settings.

8. The non-transitory computer-readable media of claim 7, further comprising:

providing the user a mobile application associated with the information delivery system by which the user can cause the values of the fields of the data structure to be updated, and wherein the user may access, interact with, and modify settings for a Life Based VR experience.

9. The computer-readable media of claim 8, further comprising:

enabling the user to cause the values of the fields of the data structure to be updated using a mobile application associated with the information delivery system, and wherein the user may access, interact with, and modify settings for a Life Based VR experience.

10. A non-transitory computer-readable media that stores instructions, which when executed by a machine, cause the machine to perform operations comprising:

receiving information about a user's life from a user who is a registered member of an information delivery system, wherein the information about the user's life includes at least demographic, health, ethnic, social and psychological information;

providing the user with input options by which the user can set parameters to control (a) access to the information about the user's life by a partner and (b) volume and frequency of filtered information to be received from the partner on behalf of the user, wherein the partner is also a registered member of the information delivery system;

receiving the filtered information from the partner, wherein the filtered information is generated by applying the parameters to information of the partner;

integrating the information into a user Life Based VR experience;

providing a marketplace for the partners or users to purchase the information about the user's life;

providing the partner with input options by which the partner can use the information about the user's life to customize information provided to the Life Based VR experience by the partner when the user interacts with a VR system of the partner;

making marketplace information displayable in the user Life Based VR experience, according to application, extent of attributes, depth of attribute detail, type, usage, and custom VR settings; and providing the user with options to interact with and use marketplace information in the user's Life Based VR experience.

11. The non-transitory computer-readable media of claim 10, wherein the marketplace is an auction-based marketplace, wherein the Life Based VR experiences include interactions that present filtered information when the VR system is associated with a Life Based VR user, and wherein the customized Life Based VR experience includes filtered, parameterized, custom integrated information, and custom settings associated with a life state, market place, and Life Based VR experience.

\* \* \* \* \*